(12) United States Patent
Cheng et al.

(10) Patent No.: US 12,487,777 B2
(45) Date of Patent: Dec. 2, 2025

(54) APPARATUS FOR A FIRST DEVICE MMIO MAPPED WITH A SECOND DEVICE AND A METHOD OF PERFORMING DATA PROCESSING OPERATIONS THEREBETWEEN

(71) Applicant: Huawei Technologies Co., Ltd., Shenzhen (CN)

(72) Inventors: Chuanning Cheng, Shenzhen (CN); Zhongwu Cheng, Shenzhen (CN); Jiwu Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 75 days.

(21) Appl. No.: 18/338,055

(22) Filed: Jun. 20, 2023

(65) Prior Publication Data

US 2023/0342086 A1 Oct. 26, 2023

Related U.S. Application Data

(63) Continuation of application No. PCT/CN2020/138049, filed on Dec. 21, 2020.

(51) Int. Cl.
*G06F 3/06* (2006.01)
(52) U.S. Cl.
CPC .......... *G06F 3/0659* (2013.01); *G06F 3/0611* (2013.01); *G06F 3/067* (2013.01)
(58) Field of Classification Search
CPC ...... G06F 3/0659; G06F 3/0611; G06F 3/067; G06F 2212/1016; G06F 2212/657; G06F 12/0284; G06F 12/109; G06F 15/17331; G06F 2212/206; G06F 13/28
See application file for complete search history.

(56) References Cited

U.S. PATENT DOCUMENTS

| 11,385,948 | B1* | 7/2022 | Livneh | G06F 11/1402 |
| 2003/0158998 | A1* | 8/2003 | Smith | G06F 3/067 |
| | | | | 711/112 |
| 2005/0114623 | A1 | 5/2005 | Craddock et al. | |
| 2010/0146222 | A1 | 6/2010 | Cox et al. | |

(Continued)

FOREIGN PATENT DOCUMENTS

| CN | 101243421 A | 8/2008 |
| CN | 103946828 A | 7/2014 |

*Primary Examiner* — Michael Krofcheck
(74) *Attorney, Agent, or Firm* — Slater Matsil, LLP

(57) ABSTRACT

Embodiments of this application disclose a data processing apparatus and method, and a related device. Storage space of a second device is mapped to a memory-mapped input/output MMIO address space of the first device. N MMIO addresses in the MMIO address space of the first device are in a one-to-one correspondence with N first storage addresses in the storage space of the second device. The processor is configured to send a first instruction to the storage controller, where the first instruction includes a target MMIO address. The storage controller is configured to: receive the first instruction, and determine a first storage address corresponding to the target MMIO address; and send a first operation instruction to the second device, where the first operation instruction corresponds to the first instruction, and the first operation instruction includes the first storage address.

18 Claims, 12 Drawing Sheets

(56) References Cited

U.S. PATENT DOCUMENTS

| | | | |
|---|---|---|---|
| 2015/0120969 A1* | 4/2015 | He | G06F 3/0611 |
| | | | 710/74 |
| 2019/0188391 A1* | 6/2019 | Margalit | G06F 21/577 |
| 2019/0243571 A1 | 8/2019 | Narayanan et al. | |

* cited by examiner

| len (data length) | src_addr (source operand address) | dst_addr (destination operand address) |

US 12,487,777 B2

APPARATUS FOR A FIRST DEVICE MMIO MAPPED WITH A SECOND DEVICE AND A METHOD OF PERFORMING DATA PROCESSING OPERATIONS THEREBETWEEN

CROSS-REFERENCE TO RELATED APPLICATIONS

This application is a continuation of International Application No. PCT/CN 2020/138049, filed on Dec. 21, 2020, the disclosure of which is hereby incorporated by reference in its entirety.

TECHNICAL FIELD

This application relates to the field of computer technologies, and in particular, to a data processing apparatus and method, and a related device.

BACKGROUND

As the Internet extends to all aspects of society, an amount of data that needs to be processed by a computer is multiplied. However, in a process in which the computer schedules external data to participate in actual computing, a central processing unit/processor (CPU) is usually largely occupied. This greatly reduces a capability of the CPU to participate in actual computing. In view of this case, direct memory access (DMA) is proposed in the industry to resolve a data migration problem in a computer system. DMA is an important feature of a modern computer system. In a modern computer, a hardware subsystem can directly access data in a memory through DMA, instead of participating in completion of data migration by using the CPU. The CPU only needs to perform corresponding processing in start and end phases of data transmission, and the CPU can execute another task in a transmission process. In this way, in most of time, the CPU and input/output are in a state of parallel operation, so that efficiency of the entire computer system is greatly improved.

As a quantity of DMA peripherals gradually increases, more devices support DMA direct access. Therefore, currently, input/output (I/O) access delays of a plurality of peripherals are gradually reduced. For example, at the international solid-state circuits conference (ISSCC) in 2020, Kioxia Semiconductor proposed XL-Flash whose transmission delay can be reduced to 4 µs. In addition, a remote direct memory access (RDMA) device has a transmission delay of only 1.2 µs for remote data. This reduction in data transmission delay contributes to a reduction in an overall DMA transmission delay.

A most common solution in DMA is an asynchronous DMA solution. A main process of the asynchronous DMA solution includes a DMA request, a DMA response, DMA transmission, and a DMA interrupt. Steps such as the DMA request and the DMA interrupt require interaction between a CPU and a DMA controller. In a previous low-speed I/O era, a CPU interaction delay is not a main reason of a DMA delay. However, in a high-speed I/O era, an I/O access delay is gradually reduced, and a proportion of an interaction delay between a DMA controller and a CPU in a DMA delay is gradually increased. This becomes one of main reasons that limit a DMA transmission rate.

Therefore, how to improve a data transmission rate between devices is an urgent problem to be resolved.

SUMMARY

Embodiments of this application provide a data processing apparatus and method, and a related device, to improve a data transmission rate between devices.

According to a first aspect, an embodiment of this application provides a data processing apparatus. The apparatus is used in a first device, and the apparatus includes a processor and a storage controller. Storage space of a second device is mapped to memory-mapped input/output MMIO address space of the first device, and N MMIO addresses in the MMIO address space of the first device are in a one-to-one correspondence with N first storage addresses in the storage space of the second device. The processor is configured to send a first instruction to the storage controller, where the first instruction includes a target MMIO address, the target MMIO address is one of the N MMIO addresses, and N is an integer greater than or equal to 1. The storage controller is configured to: receive the first instruction, and determine a first storage address corresponding to the target MMIO address; and send a first operation instruction to the second device, where the first operation instruction corresponds to the first instruction, and the first operation instruction includes the first storage address.

In this embodiment of this application, storage space of another device (for example, the second device) may be mapped to MMIO address space of a local device (for example, the first device) in advance by using a memory-mapped input/output (MMIO) technology. In this way, a processor of the local device can directly access the another device by using a same instruction as memory reading/writing. In this embodiment of this application, an instruction may be directly sent to a storage controller (for example, a DMA controller or an RDMA controller) in the local device based on the MMIO mapping by using the processor. The instruction may include an MMIO address obtained after any storage address in the storage space of the another device is mapped. After receiving the instruction, the storage controller may determine, based on a mapping relationship, the storage address corresponding to the MMIO address. Then, the storage controller may send an operation instruction to the another corresponding device based on the determined storage address, so that the another device performs an operation, for example, reads data in the storage address, or writes data into the storage address, based on the operation instruction (for example, a read/write operation instruction). In this way, the instruction is directly delivered to the storage controller by using the processor, and the storage controller completes data transmission between the local device and the another device (for example, an external memory such as a hard disk, a magnetic disk, or an optical disc). However, in the conventional technology, when data transmission is performed between a plurality of devices, a processor can deliver an instruction only to a memory in a local device. Specifically, the processor needs to first write a corresponding instruction into the memory; then the processor needs to notify a storage controller to obtain the corresponding instruction from the memory and execute the instruction; and finally the storage controller needs to generate an interrupt and report the interrupt to the processor after completing execution of the instruction. Consequently, an interaction delay between the processor and the storage controller is long, and a data transmission rate of the storage controller is limited. Therefore, a data transmission rate between devices is low. In addition, the processor is still largely occupied. Compared with the solution in the conventional technology, in this embodiment of this application, the instruction is delivered without use of a memory, and the processor can directly send the instruction to the storage controller based on the MMIO mapping, so that the storage controller can directly access the corresponding address in the storage space of the another device, to efficiently complete fast transmission of a large batch of data between devices, thereby greatly improving a data transmission rate between devices and reducing occupation of a data transmission task for the processor, and further improving overall working efficiency of a computer.

In a possible implementation, the target MMIO address is a source operand address or a destination operand address in the first instruction.

In this embodiment of this application, it may be understood that the instruction may generally include the source operand address and the destination operand address. Correspondingly, the MMIO address may be the source operand address or the destination operand address. If the MMIO address is the source operand address, the instruction may be reading data from the another device and writing the data into storage space of the local device. If the MMIO address is the destination operand address, the instruction may be writing data of the local device into the storage space of the another device. In this way, data transmission between the local device and the another device (that may be, for example, a peripheral device connected to the local device, such as a magnetic disk, a hard disk, an optical disc, or a network adapter, or may be, for example, a remote device connected to the local device by using a network, such as a cloud server) may be implemented by using the corresponding instruction sent by the processor to the storage controller. In addition, because the processor directly sends the instruction to the storage controller, an interaction delay between the processor and the storage controller is greatly reduced, thereby greatly improving a data transmission rate between devices.

In a possible implementation, the target MMIO address is the source operand address, and the first operation instruction is a read operation instruction. The storage controller is further configured to receive data sent by the second device, where the data is data that corresponds to the first storage address and that is read by the second device based on the first operation instruction. The storage controller is further configured to: write the data into the destination operand address, and send a first message to the processor, where the destination operand address is one of M second storage addresses in storage space of the first device, M is an integer greater than or equal to 1, and the first message indicates that execution of the first instruction succeeds.

In this embodiment of this application, if the local device needs to write data in the another device into a storage address of the local device, the processor of the local device may send an instruction to the storage controller of the local device. A source operand address in the instruction may be an MMIO address corresponding to a storage address in the another device, and a destination operand address in the instruction may be the storage address in the local device. The storage controller may generate a corresponding read operation instruction based on the storage address that is in the another device and that corresponds to the MMIO address, and send the read operation instruction to the another device, so that the another device reads, based on the read operation instruction, the data corresponding to the storage address of the another device, and sends the data to the storage controller of the local device. Then, the storage controller may write the data into the storage address that is in the local device and that corresponds to the instruction, to fast and efficiently complete data transmission from the another device to the local device, thereby greatly improving a rate of reading data in the another device. In addition, after completing the instruction, that is, completing writing of the data read from the another device into the storage address of the local device, the storage controller may send a corresponding message to the processor, to indicate that execution of the current instruction succeeds. Subsequently, the processor may execute a next instruction (for example, execute next-time data transmission, or execute another data processing task) based on the message, thereby improving overall data processing efficiency.

In a possible implementation, the storage controller is further configured to: if the data sent by the second device is not received within a preset time range, resend the first operation instruction to the second device at least once within a preset time quantity range. The storage controller is further configured to: if the data sent by the second device is not received after the first operation instruction is resent at least once, send a second message to the processor, where the second message indicates that execution of the first instruction fails.

In this embodiment of this application, a timeout detection mechanism may be further set. If the local device wants to read data in the another device, but the another device does not feed back the corresponding data to the local device for long time after receiving a corresponding read operation instruction, the storage controller may send the read operation instruction to the another device again. Further, if the another device still does not feed back the corresponding data after the read operation instruction is sent a plurality of times, the storage controller may send a message to the processor in this case to indicate that execution of the current instruction fails, and subsequently the processor may execute a next instruction based on the message, without being consumed in one time of data transmission for long time, thereby improving overall data transmission efficiency.

In a possible implementation, the processor is further configured to: when receiving the first message or the second message, execute a next instruction.

In this embodiment of this application, as described above, if execution of a current data transmission instruction succeeds or does not succeed for long time, the storage controller may send a corresponding message to the processor, to indicate that execution of the current instruction succeeds or fails. Then, the processor may execute a next instruction (for example, execute next-time data transmission, or execute another data processing task) based on the message, thereby improving overall data processing efficiency. In some possible embodiments, if the processor receives an execution failure message, the processor may further check a status of the another device, a network status, and the like, to ensure effective execution of a subsequent data transmission task.

In a possible implementation, the target MMIO address is the destination operand address, and the first operation instruction is a write operation instruction. The storage controller is further configured to read data corresponding to the source operand address, and send the data to the second device, where the source operand address is one of M second storage addresses in storage space of the first device, and M is an integer greater than or equal to 1. The storage controller is further configured to: receive a response message sent by the second device, and send a first message to the processor based on the response message, where the response message is a message sent by the second device after the second device writes the data into the first storage address based on the first operation instruction, and the first message indicates that execution of the first instruction succeeds.

In this embodiment of this application, if the local device needs to write data stored in the local device into the another device, the processor of the local device may send an instruction to the storage controller of the local device. A destination operand address in the instruction may be an MMIO address corresponding to a storage address in the another device, and a source operand address in the instruction may be a storage address in the local device. The storage controller may read the corresponding data in the local device based on the instruction, and send the data to the another device. Simultaneously, the storage controller may further generate a corresponding write operation instruction based on the storage address that is in the another device and that corresponds to the MMIO address, and send the write operation instruction to the another device, so that the another device writes, based on the write operation instruction, the data read in the local device into the storage address, to fast and efficiently complete data transmission from the local device to the another device, thereby greatly improving a rate of writing data into the another device. In addition, after completing the write operation instruction, the another device may send a corresponding response message to the storage controller of the local device. Further, after receiving the response message, the storage controller may send a corresponding message to the processor, to indicate that execution of the current instruction succeeds. Subsequently, the processor may execute a next instruction (for example, execute next-time data transmission, or execute another data processing task) based on the message, thereby improving overall data processing efficiency.

In a possible implementation, the storage controller is further configured to: if the response message sent by the second device is not received within a preset time range, resend the first operation instruction to the second device at least once within a preset time quantity range. The storage controller is further configured to: if the response message sent by the second device is not received after the first operation instruction is resent at least once, send a second message to the processor, where the second message indicates that execution of the first instruction fails.

In this embodiment of this application, a timeout detection mechanism may be further set. If the local device wants to write data of the local device into the another device, but the another device does not feed back a response message for long time (the another device does not successfully write the received data of the local device into a corresponding storage address of the another device), the storage controller may send a corresponding write operation instruction to the another device again. Further, if the another device still does not provide feedback after the write operation instruction is sent a plurality of times, the storage controller may send a message to the processor in this case to indicate that execution of the current instruction fails, and subsequently the processor may execute a next instruction based on the message, without being consumed in one time of data transmission for long time, thereby improving overall data transmission efficiency.

In a possible implementation, the processor is further configured to: when receiving the first message or the second message, execute a next instruction.

In this embodiment of this application, as described above, if execution of a current data transmission instruction succeeds or does not succeed for long time, a corresponding message may be sent to the processor, to indicate that execution of the current instruction succeeds or fails. Then, the processor may execute a next instruction (for example, execute next-time data transmission, or execute another data processing task) based on the message, thereby improving overall data processing efficiency. In some possible embodiments, if the processor receives an execution failure message, the processor may further check a status of the another device, a network status, and the like, to ensure effective execution of a subsequent data transmission task.

In a possible implementation, the second device is a remote device connected to the first device by using a network, and the storage controller is a remote direct memory access RDMA controller. The storage controller is specifically configured to send the first operation instruction to the second device through a network connection.

In this embodiment of this application, in some possible implementations, the local device may perform data transmission with a remote device connected by using a network. The remote device may be, for example, a cloud server or a background server of a related application in the local device. Correspondingly, in some of the foregoing possible implementations, the storage controller may be an RDMA controller (may be specifically a synchronous RDMA controller). The RDMA controller may directly receive an instruction sent by the processor, and determine a storage address that is in the remote device and that corresponds to an MMIO address in the instruction; and then may send an operation instruction to the remote device through the network connection, to perform an operation, for example, read data in the storage address, or write data into the storage address. As described above, in this process, because the processor does not need to write an instruction into the memory in advance, and then notify the storage controller to read the instruction from the memory to execute the corresponding instruction, an interaction delay between the processor and the storage controller is greatly reduced, thereby further improving a data transmission rate between the local device and the remote device.

In a possible implementation, the second device is a peripheral device connected to the first device through a bus, and the storage controller is a direct memory access DMA controller. The storage controller is specifically configured to send the first operation instruction to the second device through a bus connection.

In this embodiment of this application, in some possible implementations, the local device may perform data transmission with a peripheral device connected through a bus (for example, a peripheral component interconnect express (PCIe)). The peripheral device may be, for example, a hard disk, a magnetic disk, a USB flash drive, or an optical disc. Correspondingly, in some of the foregoing possible implementations, the storage controller may be a DMA controller (may be specifically a synchronous DMA controller). The DMA controller may directly receive an instruction sent by the processor, and determine a storage address that is in the peripheral device and that corresponds to an MMIO address in the instruction; and then may send an operation instruction to the peripheral device through a bus connection, to perform an operation, for example, read data in the storage address, or write data into the storage address. As described above, in this process, because the processor does not need to write an instruction into the memory in advance, and then notify the storage controller to read the instruction from the memory to execute the corresponding instruction, an interaction delay between the processor and the storage controller is greatly reduced, thereby further improving a data transmission rate between the local device and the peripheral device.

In a possible implementation, storage space of a plurality of devices is mapped to the MMIO address space of the first device, and the second device is one of the plurality of devices. The storage controller is further configured to determine, based on the target MMIO address and a mapping relationship, the second device corresponding to the first instruction.

In this embodiment of this application, storage space of a plurality of remote devices or peripheral devices may be mapped to the MMIO address space of the local device, to increase data transmission rates between the local device and the devices. In addition, a device corresponding to an MMIO address that is accessed this time may be determined based on mapping relationships between storage addresses of the devices and MMIO addresses by using the storage controller (for example, the foregoing DMA controller or RDMA controller), to send a corresponding operation instruction to the device to access a storage address that is in the device and that corresponds to the MMIO address, thereby ensuring data transmission accuracy and efficiency.

In a possible implementation, the apparatus further includes a memory management unit. The processor is specifically configured to send a first data packet to the memory management unit, where the first data packet includes the first instruction, and the first data packet carries a virtual address. The memory management unit is configured to receive the first data packet, and determine a physical address corresponding to the virtual address, where the physical address is an MMIO address in the MMIO address space, and the physical address is used to indicate that the first data packet is a data packet sent to the storage controller. The memory management unit is further configured to send the first data packet to the storage controller based on the physical address. The storage controller is specifically configured to receive the first data packet, and obtain the first instruction in the first data packet.

In this embodiment of this application, the processor may deliver an instruction to the storage controller in a form of a data packet. Specifically, the processor may first send a data packet including an instruction to the memory management unit. After receiving the data packet, the memory management unit may first map a virtual address carried in the data packet to a corresponding physical address. The physical address may be an MMIO address that is marked in the MMIO address space in advance and that corresponds to the storage controller. Then, the memory management unit may determine, based on the physical address, to directly send the data packet to the storage controller. In this way, the processor directly delivers the instruction to the storage controller. Compared with a solution in which for example, a processor needs to first write an instruction into a memory and then notify a storage controller to obtain the instruction from the memory in the conventional technology, in this embodiment of this application, work of the processor is reduced, and instruction obtaining costs of the storage controller are correspondingly reduced, thereby greatly improving an overall data transmission rate.

According to a second aspect, an embodiment of this application provides a data processing method. The method is applied to a first device, and the first device includes a processor and a storage controller. Storage space of a second device is mapped to memory-mapped input/output MMIO address space of the first device, and N MMIO addresses in the MMIO address space of the first device are in a one-to-one correspondence with N first storage addresses in the storage space of the second device. The method includes: sending a first instruction to the storage controller by using the processor, where the first instruction includes a target MMIO address, the target MMIO address is one of the N MMIO addresses, and N is an integer greater than or equal to 1; and receiving, by using the storage controller, the first instruction, and determining a first storage address corresponding to the target MMIO address; and sending a first operation instruction to the second device, where the first operation instruction corresponds to the first instruction, and the first operation instruction includes the first storage address.

In a possible implementation, the target MMIO address is a source operand address or a destination operand address in the first instruction.

In a possible implementation, the target MMIO address is the source operand address, and the first operation instruction is a read operation instruction. The method further includes: receiving, by using the storage controller, data sent by the second device, where the data is data that corresponds to the first storage address and that is read by the second device based on the first operation instruction; and writing, by using the storage controller, the data into the destination operand address, and sending a first message to the processor, where the destination operand address is one of M second storage addresses in storage space of the first device, M is an integer greater than or equal to 1, and the first message indicates that execution of the first instruction succeeds.

In a possible implementation, the method further includes: if the data sent by the second device is not received within a preset time range by using the storage controller, resending the first operation instruction to the second device at least once within a preset time quantity range by using the storage controller; and if the data sent by the second device is not received after the first operation instruction is resent at least once by using the storage controller, sending a second message to the processor by using the storage controller, where the second message indicates that execution of the first instruction fails.

In a possible implementation, the method further includes: when receiving the first message or the second message, executing a next instruction by using the processor.

In a possible implementation, the target MMIO address is the destination operand address, and the first operation instruction is a write operation instruction. The method further includes: reading, by using the storage controller, data corresponding to the source operand address, and sending the data to the second device, where the source operand address is one of M second storage addresses in storage space of the first device, and M is an integer greater than or equal to 1; and receiving, by using the storage controller, a response message sent by the second device, and sending a first message to the processor based on the response message, where the response message is a message sent by the second device after the second device writes the data into the first storage address based on the first operation instruction, and the first message indicates that execution of the first instruction succeeds.

In a possible implementation, the method further includes: if the response message sent by the second device is not received within a preset time range by using the storage controller, resending the first operation instruction to the second device at least once within a preset time quantity range by using the storage controller; and if the response message sent by the second device is not received after the first operation instruction is resent at least once by using the storage controller, sending a second message to the processor by using the storage controller, where the second message indicates that execution of the first instruction fails.

In a possible implementation, the method further includes: when receiving the first message or the second message, executing a next instruction by using the processor.

In a possible implementation, the second device is a remote device connected to the first device by using a network, and the storage controller is a remote direct memory access RDMA controller. The sending a first operation instruction to the second device includes: sending the first operation instruction to the second device by using the storage controller and the network connection.

In a possible implementation, the second device is a peripheral device connected to the first device through a bus, and the storage controller is a direct memory access DMA controller. The sending a first operation instruction to the second device includes: sending the first operation instruction to the second device by using the storage controller and the bus connection.

In a possible implementation, storage space of a plurality of devices is mapped to the MMIO address space of the first device, and the second device is one of the plurality of devices. The method further includes: determining, based on the target MMIO address and a mapping relationship by using the storage controller, the second device corresponding to the first instruction.

In a possible implementation, the first device further includes a memory management unit. The sending a first instruction to the storage controller by using the processor includes: sending a first data packet to the memory management unit by using the processor, where the first data packet includes the first instruction, and the first data packet carries a virtual address; receiving, by using the memory management unit, the first data packet, and determining a physical address corresponding to the virtual address, where the physical address is an MMIO address in the MMIO address space, and the physical address is used to indicate that the first data packet is a data packet sent to the storage controller; and sending the first data packet to the storage controller based on the physical address by using the memory management unit; and the receiving the first instruction by using the storage controller includes: receiving, by using the storage controller, the first data packet, and obtaining the first instruction in the first data packet.

According to a third aspect, this application provides a computer device. The computer device includes the data processing apparatus according to any one of the first aspect or the possible implementations of the first aspect, and is configured to implement the process of the data processing method according to any one of the second aspect or the possible implementations of the second aspect. The computer device may further include a memory. The memory is configured to be coupled to a processor, and the memory stores program instructions and data that are necessary for the terminal. The terminal may further include a communication interface, used by the terminal to communicate another device or a communication network.

According to a fourth aspect, an embodiment of this application provides a computer-readable storage medium. The computer-readable storage medium stores a computer program, and when the computer program is executed by a processor, the process of the data processing method according to any one of the second aspect or the possible implementations of the second aspect is implemented.

According to a fifth aspect, an embodiment of this application provides a computer program. The computer program includes instructions, and when the computer program is executed by a computer, the computer is enabled to perform the process of the data processing method according to any one of the second aspect or the possible implementations of the second aspect.

According to a sixth aspect, an embodiment of this application provides a chip system. The chip system includes the data processing apparatus according to any one of the first aspect or the possible implementations of the first aspect, and is configured to implement the functions in the process of the data processing method according to any one of the second aspect or the possible implementations of the second aspect. In a possible design, the chip system further includes a memory, and the memory is configured to store program instructions and data that are necessary for applying the processing method. The chip system may include a chip, or may include a chip and another discrete component.

DETAILED DESCRIPTION OF ILLUSTRATIVE EMBODIMENTS

Figure 1:
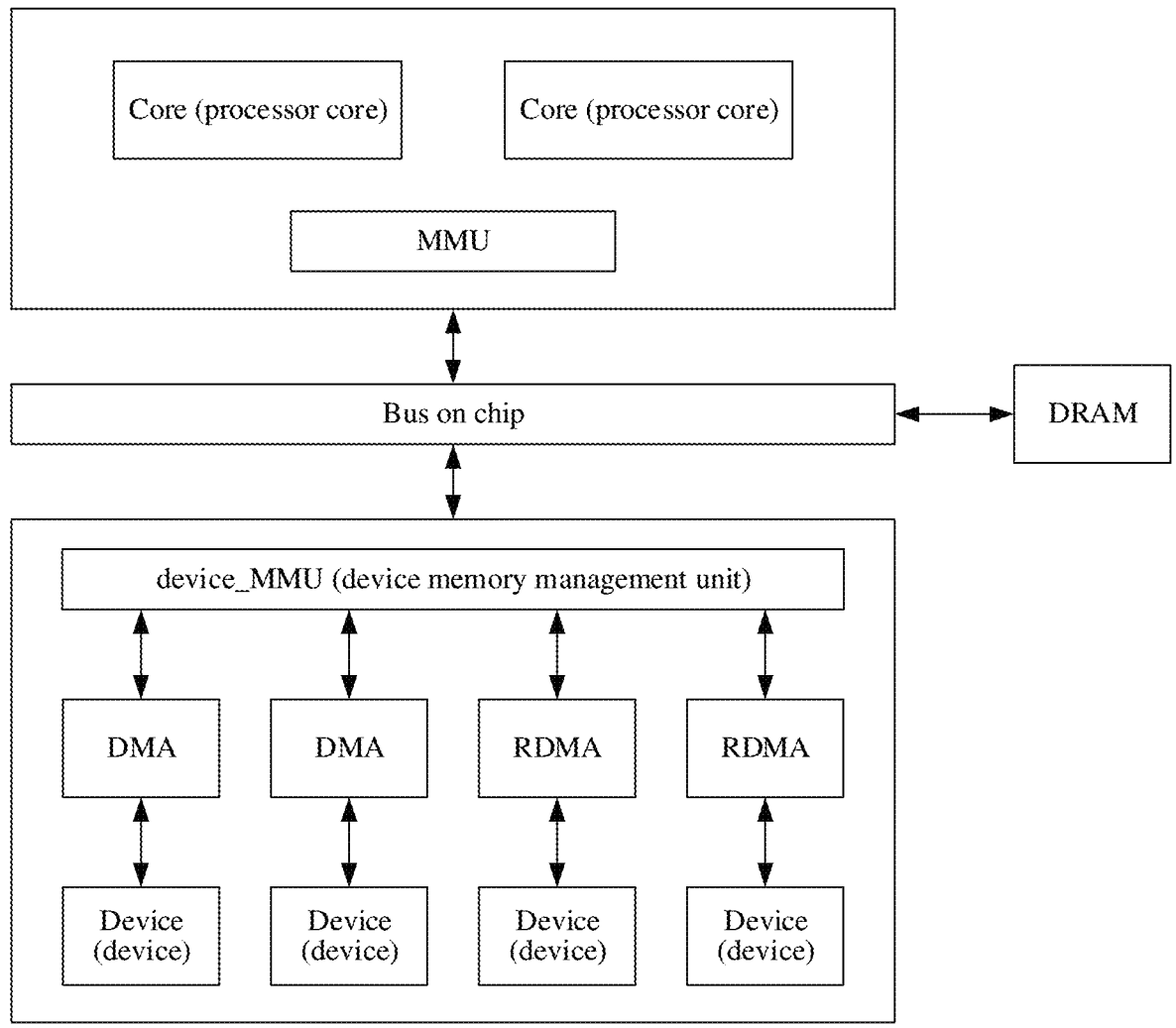
FIG. 1 is a schematic diagram of an architecture of a DMA/an RDMA system.

The following describes embodiments of this application with reference to accompanying drawings in embodiments of this application.

In the specification, claims, and accompanying drawings of this application, the terms such as "first", "second", "third", and "fourth" are intended to distinguish between different objects, but are not intended to describe a particular order. In addition, the terms "include" and "have" and any other variants thereof are intended to cover non-exclusive inclusions. For example, a process, a method, a system, a product, or a device that includes a series of steps or units is not limited to the listed steps or units, but optionally further includes an unlisted step or unit, or optionally further includes another inherent step or unit of the process, the method, the system, the product, or the device.

The phrase "an embodiment" mentioned in this specification means that a specific feature, structure, or characteristic described with reference to the embodiment may be included in at least one embodiment of this application. The phrase appearing at various locations in this specification does not necessarily indicate a same embodiment, or an independent or alternative embodiment exclusive from another embodiment. It is explicitly and implicitly understood by persons skilled in the art that the embodiments described in this specification may be combined with other embodiments.

The terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both an application that runs on a computing device and the computing device may be components. One or more components may reside in a process and/or an execution thread, and a component may be located in one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system, a distributed system, and/or across a network such as the Internet interacting with another system by using the signal).

First, some terms in this application are described to facilitate understanding of persons skilled in the art.

(1) Memory-mapped input/output (MMIO): MMIO is a part of a peripheral component interconnect (PCI) specification. An I/O device is placed in memory space instead of I/O space. From a perspective of a processor, after the memory-mapped I/O, a system device is accessed in a same manner as a memory. In this way, access to a basic input/output system (BIOS), a PCI device, and the like can be completed by using a same assembly instruction as memory reading/writing, thereby simplifying programming difficulty and interface complexity.

(2) Peripheral device: The peripheral device is briefly referred to as "peripheral", and is a hardware device externally connected to a computer host. The peripheral device plays roles of transmission, transfer, and storage for data and information, and is an important component of a computer system. Because there are various types of peripheral devices, and some devices have a plurality of functions, it has been difficult to accurately classify the peripheral devices so far. Based on different functions, the peripheral devices may be roughly classified into five types: an input device, a display device, a print device, an external memory, and a network device; and may specifically include, for example, a hard disk, a magnetic disk, a magnetic tape, an optical disc, a USB flash drive, and a network adapter.

(3) Page fault: Most systems that use virtual memories use a paging technology. Virtual address space is divided into units referred to as pages, and corresponding physical address space is also divided into units referred to as page frames. A size of the page needs to be the same as a size of the page frame, and a page can be mapped to a corresponding page frame. Because the virtual address space is far greater than the physical address space, not all pages in the virtual address space can be mapped to corresponding page frames in the physical address space. In this way, in a program execution process, if a virtual address used for an instruction is an unmapped page, a memory management unit (memory management unit, MMU) may notify a CPU that a page fault (page fault) occurs. In this case, an operating system needs to handle the page fault. The operating system needs to find at least one page frame that is seldom used currently from existing page frames and write data in the page frame into an external memory (the action is also referred to as page copy), for example, the foregoing peripheral such as the hard disk or the magnetic disk; then map the page that needs to be referenced to the page frame that is just released (the action is also referred to as modifying a mapping relationship); and finally re-execute the instruction.

(4) Direct memory access (DMA): DMA is an important feature of a modern computer system. DMA allows hardware apparatuses at different speeds to perform data transmission without relying on heavy interrupt load of a CPU. More typically, for example, a block of an external memory is moved to a faster memory area inside a chip through DMA. This transmission action is implemented and completed by a DMA controller, so that work of a processor is not delayed. Instead, the processor can be rescheduled to process other work. A complete DMA transmission process may include four steps: a DMA request, a DMA response, DMA transmission, and a DMA interrupt.

DMA is mainly applied to the following two aspects: According to a first aspect, DMA may be applied to some high-speed I/O devices (the I/O devices may be generally classified into a character device (for example, a character terminal that integrates a keyboard and a display, a printer, a scanner, or a mouse), a block device (alternatively referred to as an external memory, for example, the magnetic disk, the magnetic tape, or the optical disc), and a network communication device (for example, a network adapter or a modem)). In addition, all memories may also be considered as I/O devices, such as a hard disk, a floppy disk, and a compact disc. These high-speed I/O devices transmit bytes or words very fast. For such a high-speed I/O device, if byte information is transmitted by using an input/output instruction or by using an interrupt method, a large amount of time of a CPU is occupied, and a data loss is also likely caused. The DMA manner can enable the I/O device to directly fast transmit data in batches with a memory. According to a second aspect, DMA may be applied to a system that needs to perform high-speed large-batch data transmission, to improve a data throughput. For example, DMA is widely applied to aspects such as magnetic disk access, image processing, a high-speed data obtaining system, and signal receiving/sending in synchronous communication.

(5) Remote direct memory access (RDMA): RDMA is generated to resolve a delay of data processing at a server end in network transmission. In RDMA, data is directly transmitted to a storage area of a computer by using a network, to fast move data from a system to a memory of a remote system without causing any impact on an operating system. In this way, a processing function of the computer is not largely required, in other words, a CPU is not largely occupied. This eliminates overheads of external memory copy and context switching, and therefore can free up memory bandwidth and a CPU cycle to improve application system performance.

FIG. 1 is a schematic diagram of an architecture of a DMA/an RDMA system. As shown in FIG. 1, the computer system may include a processor, a memory management unit MMU, a bus on chip, a dynamic random access memory (dynamic random access memory, DRAM), a device memory management unit (device_MMU), a plurality of DMA controllers, a plurality of RDMA controllers, and devices (device) separately connected to the plurality of DMA controllers and the plurality of RDMA controllers. The bus on chip may be connected to the DRAM. As shown in FIG. 1, the processor may include a plurality of processor cores, and each processor core may independently execute a corresponding task. As shown in FIG. 1, in the computer system, data transmission may be performed with a device by using a DMA controller or an RDMA controller. For example, data in the DRAM of the computer system may be written into the device by using the DMA controller or the RDMA controller, or data in the device may be written into the DRAM of the computer system by using the DMA controller or the RDMA controller. As described above, the processor does not need to participate in device access and data transmission that are performed by using the DMA/RDMA controller, and the processor can execute another task in the process, thereby greatly improving efficiency of the computer system, and the like. Details are not described herein.

It may be understood that the foregoing DMA/RDMA-related computer system architecture is merely some example implementations provided in embodiments of this application. A computer system architecture, a corresponding processor architecture, and the like in embodiments of this application include but are not limited to the foregoing implementations.

To facilitate understanding of embodiments of this application, a technical problem to be specifically resolved in this application is further analyzed and proposed. In the conventional technology, a plurality of technical solutions are included for improving data transmission efficiency through DMA. The following describes a common solution as an example.

Figure 2A:
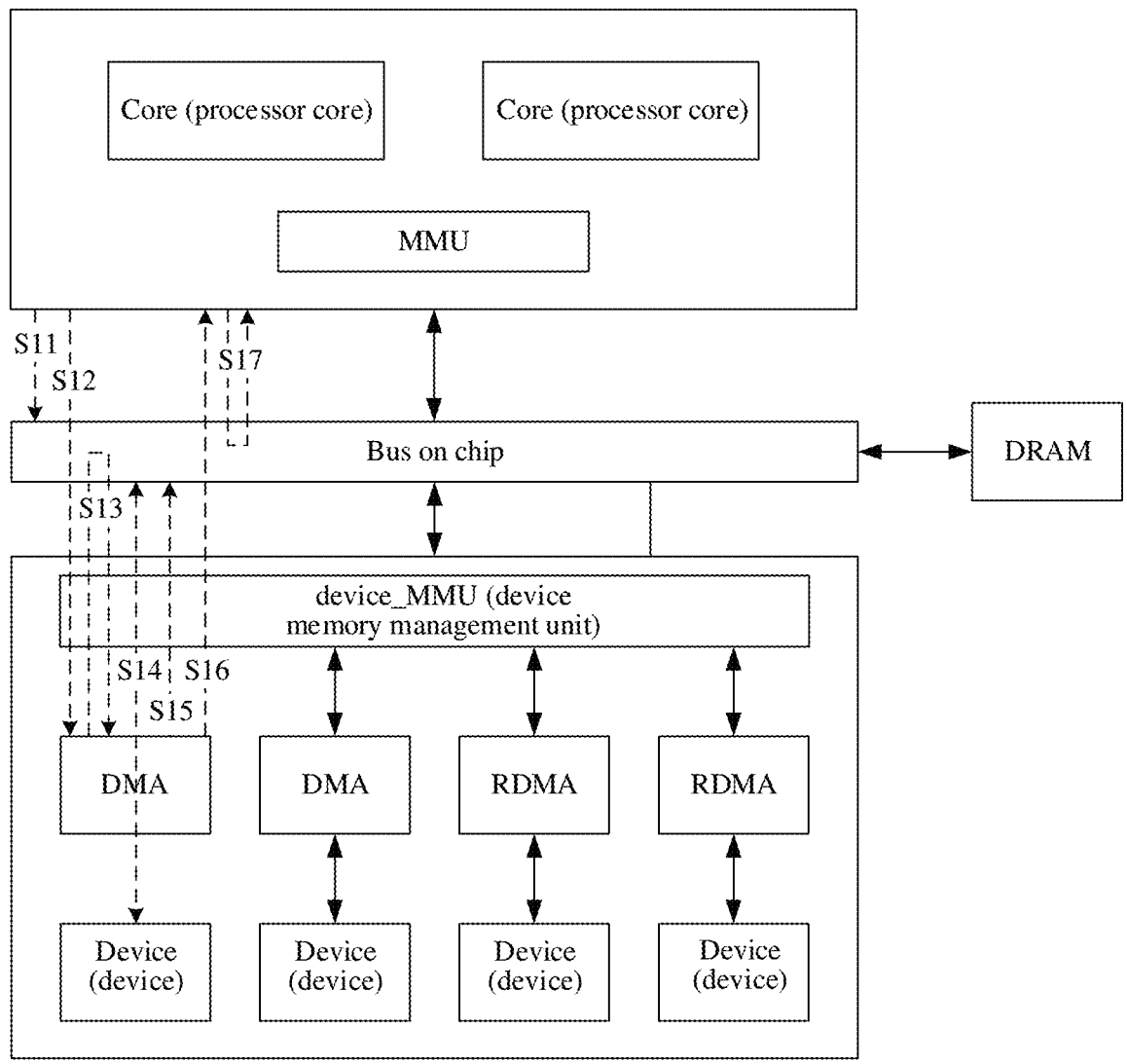
FIG. 2a is a schematic diagram of an asynchronous DMA data transmission process.

FIG. 2a is a schematic diagram of an asynchronous DMA data transmission process. As shown in FIG. 2a, for example, a local device (for example, a computer) writes data into a peripheral device (for example, a memory in FIG. 2a, which may be specifically, for example, a hard disk or a magnetic disk connected to the computer). The asynchronous DMA data transmission process may include the following steps.

Figure 2B:
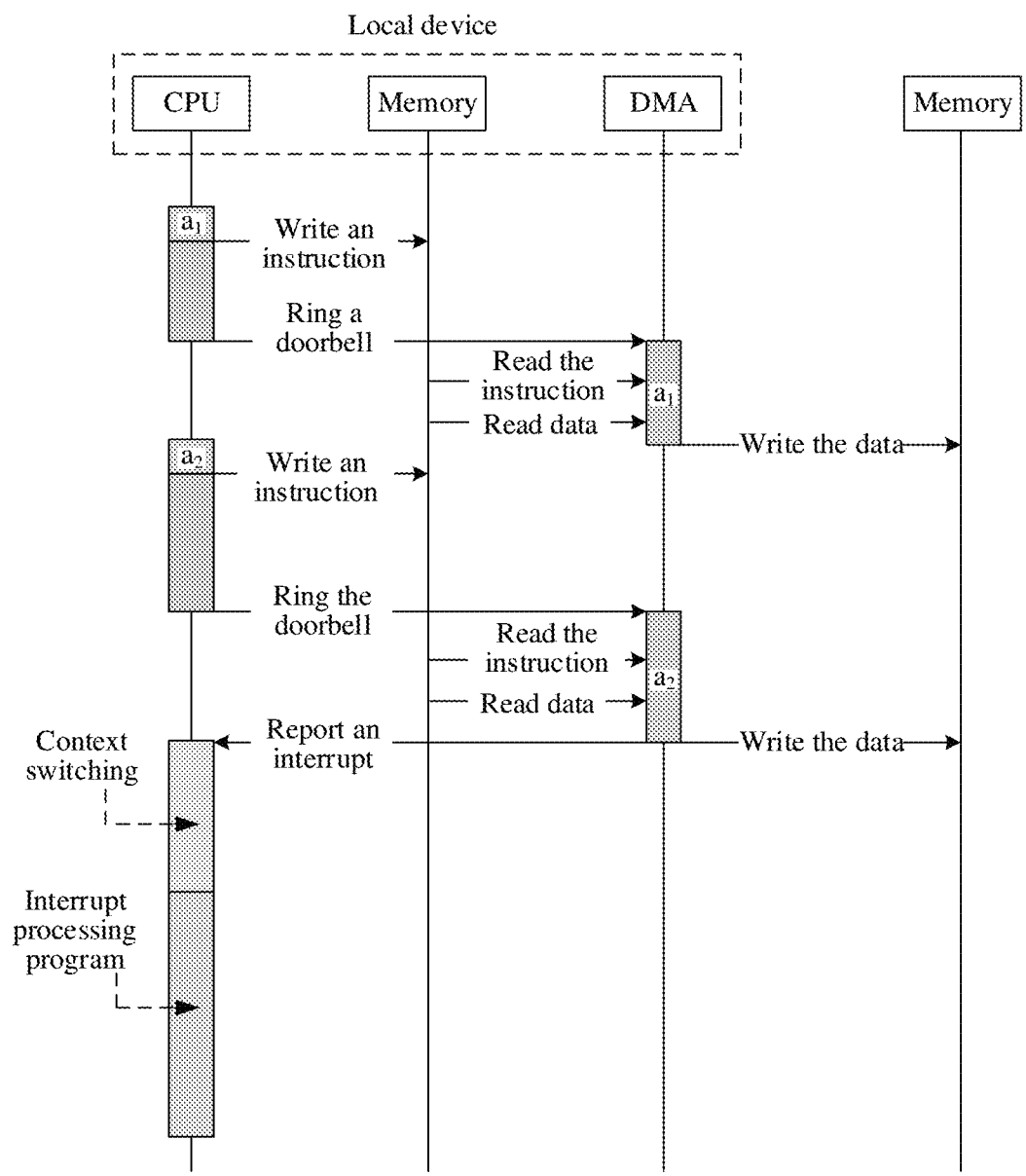
FIG. 2b is a schematic diagram of another asynchronous DMA data transmission process.

Step S11: A CPU writes an instruction into a memory (for example, writes the instruction into a DRAM connected to a bus on chip in FIG. 2a), and may specifically writes the instruction into a submission queue (SQ) in the memory. Refer to FIG. 2b together. FIG. 2b is a schematic diagram of another asynchronous DMA data transmission process. For step S11, further refer to FIG. 2b. As shown in FIG. 2b, when processing a data transmission task $a_1$, the CPU may first write an instruction corresponding to the data transmission task $a_1$ into the memory.

Step S12: The CPU writes data into a doorbell (DB) of a DMA controller, to notify the DMA controller to obtain the to-be-executed instruction from the SQ queue of the memory. For step S12, further refer to FIG. 2b. As shown in FIG. 2b, after writing the instruction corresponding to the data transmission task $a_1$ into the memory, the CPU may ring the doorbell to enter the DMA controller, to notify the DMA controller to read the instruction from the memory. It should be noted that, after the CPU completes execution of the process, that is, after the CPU notifies the DMA controller to obtain the to-be-executed instruction from the SQ queue, the CPU does not participate in a subsequent data transmission task of the DMA controller. In this case, the CPU can execute another task. In this way, overall working efficiency of the computer can be improved.

Step S13: The DMA controller reads the to-be-executed instruction from the SQ queue in the memory based on the notification of the CPU. For step S13, further refer to FIG. 2b. As shown in FIG. 2b, the DMA controller reads data corresponding to the data transmission task $a_1$ from the memory based on the doorbell ringing action of the CPU.

Step S14: The DMA controller executes a corresponding data transmission task based on content of the instruction. As shown in FIG. 2a, the DMA controller may directly access the memory (for example, the DRAM in FIG. 2a) in the local device by using the bus on chip, and read data corresponding to the instruction from the memory, and then the DMA controller may write the data into the peripheral device. Optionally, execution of the instruction may be writing a large batch of data a plurality of times, or the like. For step S14, further refer to FIG. 2b. Details are not described herein.

Step S15: After completing execution of the instruction, the DMA controller writes an execution result into a completion queue (CQ) in the memory, and updates a tail pointer of the CQ.

Step S16: The DMA controller generates an interrupt and reports the interrupt to the CPU. For step S16, further refer to FIG. 2b. Details are not described herein.

Step S17: The CPU updates a head pointer of the SQ by reading the execution result in the specified channel CQ. Optionally, for step S17, further refer to FIG. 2b. As shown in FIG. 2b, after accumulating completion of execution of a plurality of transmission tasks (for example, as shown in FIG. 2b, after completing execution of data transmission tasks $a_1$ and $a_2$), the DMA controller may generate an interrupt and report the interrupt to the CPU. After receiving the interrupt, the CPU immediately terminates currently processed work and saves data corresponding to the current work, and then performs ending processing on the data transmission tasks $a_1$ and $a_2$, for example, reads the execution result in the specified channel CQ, and updates the head pointer of the SQ, as described above. In this case, the data transmission tasks $a_1$ and $a_2$ are executed.

As described above, before actual data transmission (a rectangle $a_1$ or $a_2$ shown on a DMA side in FIG. 2b) starts, the CPU needs to first write an instruction into a queue in the memory, and then ring the doorbell to notify the DMA controller to obtain the corresponding instruction from the queue in the memory. In an actual data transmission process, the DMA controller fully controls data reading and writing. In this case, the CPU can execute another task. After the actual data transmission ends, the DMA controller needs to generate an interrupt and report the interrupt to the CPU. After receiving the interrupt, the CPU needs to immediately stop a currently executed task, and perform an operation, for example, read an execution result of the instruction from the memory. Therefore, one time of complete asynchronous DMA data transmission is completed.

Figure 2C:
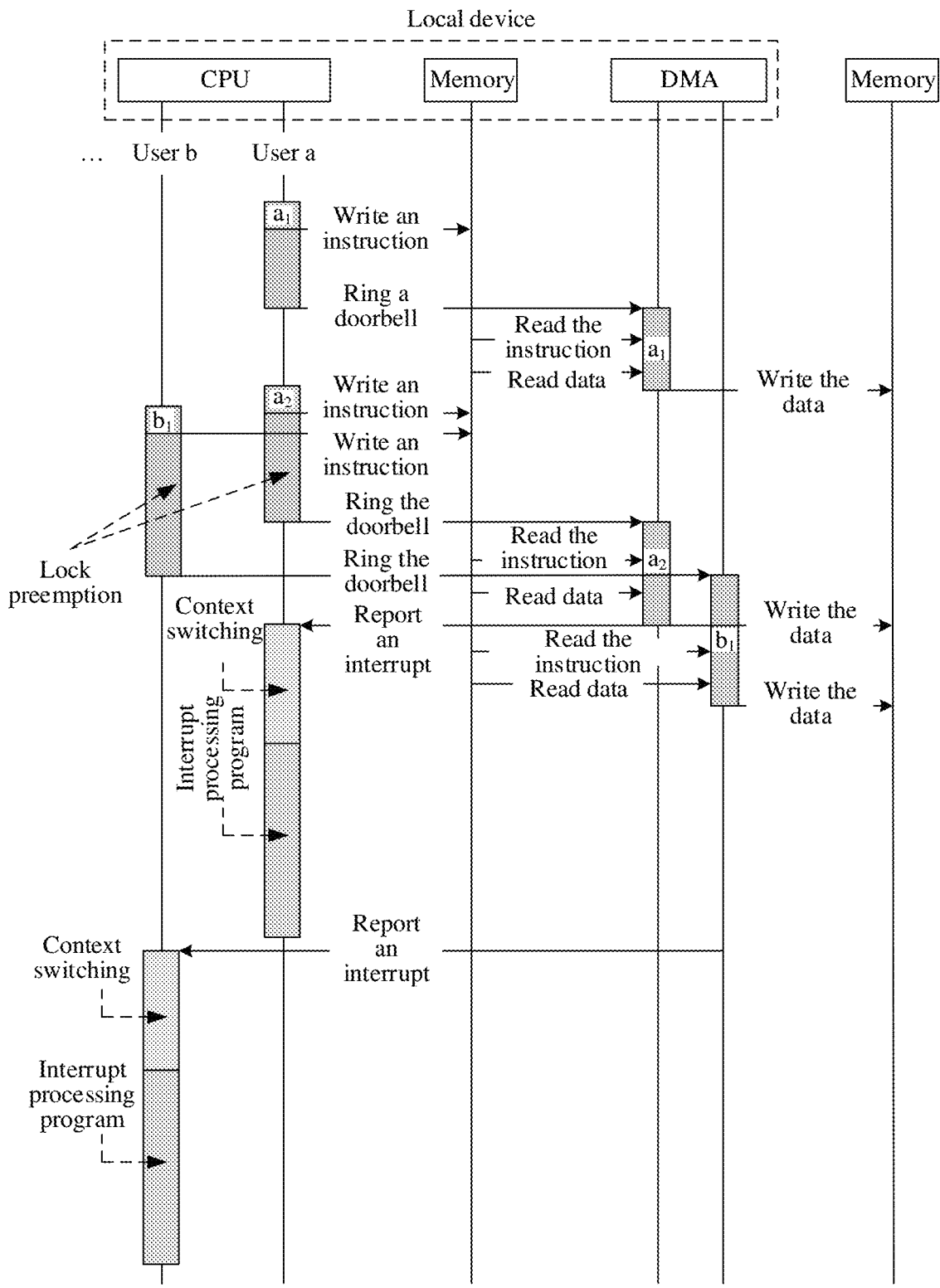
FIG. 2c is a schematic diagram of still another asynchronous DMA data transmission process.

Disadvantages of this Solution are as Follows:

As described above, in this solution, the CPU does not directly send an instruction to the DMA controller; but first writes the instruction into a queue in the memory, and then rings the doorbell to notify the DMA controller to obtain the corresponding instruction from the queue in the memory. In this way, complex processes such as writing the DMA instruction to the memory and ringing the doorbell to enter the DMA controller are involved. In addition, refer to FIG. 2c together. FIG. 2c is a schematic diagram of still another asynchronous DMA data transmission process. As shown in FIG. 2c, when the CPU needs to simultaneously process data transmission tasks, for example, data transmission tasks $a_2$ and $b_1$ in FIG. 2c, of a plurality of users (for example, a user a and a user b in FIG. 2c, where the user a, the user b, and the like may be virtual users), in a process of ringing the doorbell after writing an instruction, the two parties are involved in lock preemption, and only one party that succeeds in lock preemption can ring the doorbell to enter the DMA controller. As shown in FIG. 2c, the data transmission task $a_2$ succeeds in lock preemption and first rings the doorbell to enter the DMA controller; and the data transmission task $b_1$ fails in lock preemption. Therefore, only after the other party completes doorbell ringing, the data transmission task $b_1$ can continue lock preemption to ring the doorbell to enter the DMA controller. Clearly, as shown in FIG. 2c, lock preemption consumes a large amount of time. Originally, for the data transmission tasks $a_2$ and $b_1$, if the instructions are simultaneously written into the memory, doorbell ringing and data transmission may be simultaneously performed. However, due to existence of a lock preemption mechanism, a party that fails in lock preemption can only stop an action and wait for the other party to complete doorbell ringing. In this way, time of the CPU is greatly occupied, and an overall data transmission rate is reduced. In some scenarios, lock preemption time may be approximately 3 μs or even more. In addition, after completing data migration, the DMA controller needs to notify the CPU by using an interrupt, where CPU interrupt overheads (time consumed by context switching and an interrupt processing program shown in FIG. 2c) may reach an order of μs. In this way, compared with a transmission delay of several μs of a high-speed I/O device, an interaction delay between the DMA controller and the CPU accounts for 50% or even higher of a total DMA delay. This greatly limits a transmission rate of the DMA controller, and cannot meet a modern fast movement requirement for a large batch of data.

In addition, the foregoing asynchronous DMA solution does not support direct access to another device (for example, a remote device connected to the local device by using a network) in a network node. Usually, the another device in the network node can be accessed and data transmission with the device can be completed only based on a series of instructions.

In conclusion, the foregoing asynchronous DMA solution can effectively improve a data transmission rate between devices, reduce CPU occupation, and improve overall working efficiency. However, in the asynchronous DMA solution, because there are a large quantity of times of interaction between the CPU and the DMA controller, and an interaction delay is long, an overall data transmission rate of the DMA controller is greatly limited. Therefore, when the DMA controller has been actually able to perform fast data transmission, because a long interaction delay exists with the CPU before the data transmission and after the data transmission, an overall data transmission rate of the DMA controller has never been further improved. Therefore, a fast migration requirement for a large batch of data in a high-speed I/O era cannot be met.

Therefore, to resolve a problem that an actual service requirement is not met in a current data transmission technology, a technical problem to be actually resolved in embodiments of this application includes the following aspects:

According to an aspect, for a data transmission problem between a local device and a peripheral device connected to the local device, based on an idea of synchronous DMA, a CPU directly sends an instruction to a DMA controller through MMIO address mapping, to reduce an interaction delay between the DMA controller and the CPU, thereby improving a data transmission rate between the local device and the peripheral device.

According to another aspect, correspondingly, for a data transmission problem between a local device and a remote device (for example, a server that may be connected to the local device by using a network) connected to the local device, based on an idea of synchronous RDMA, a CPU directly sends an instruction to an RDMA controller through MMIO address mapping, to reduce an interaction delay between the RDMA controller and the CPU, thereby improving a data transmission rate between the local device and the remote device.

Figure 3:
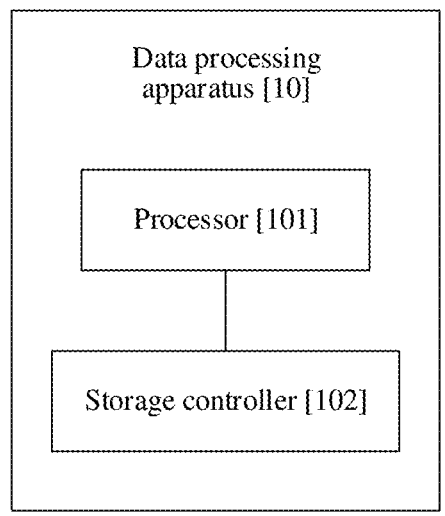
FIG. 3 is a schematic diagram of a structure of a data processing apparatus according to an embodiment of this application.

FIG. 3 is a schematic diagram of a structure of a data processing apparatus according to an embodiment of this application. The data processing apparatus 10 may be located in any electronic device. The electronic device may be various devices such as an intelligent wearable device, a smartphone, a tablet computer, a notebook computer, a desktop computer, a server, a personal digital assistant, a smart vehicle-mounted device, or a smart household appliance. This is not specifically limited in this embodiment of this application. The data processing apparatus 10 may be specifically a chip, a chip set, or a circuit board on which a chip or a chip set is mounted. The chip, the chip set, or the circuit board on which the chip or the chip set is mounted may work under driving of necessary software, or the like. This is not specifically limited in this embodiment of this application. In addition, it should be noted that this embodiment of this application may be applied to any chip, device, or apparatus in which a plurality of instructions are processed in parallel, and there is no limitation on whether an implementation of the chip, device, or apparatus is hardware or software.

As shown in FIG. 3, the data processing apparatus 10 may include a processor 101 and a storage controller 102. In a scenario in which data transmission is performed between devices, the data processing apparatus 10 may be used in a local device, for example, the foregoing electronic device such as the smartphone, the tablet computer, the notebook computer, the desktop computer, or the server. For example, when the local device executes a program, if a page fault occurs, that is, double data rate synchronous dynamic random access memory (double data rate synchronous dynamic random access memory, DDR SDRAM) pages are insufficient and therefore data in a corresponding page frame in a memory of the local device needs to be migrated to a peripheral device or a remote device, the local device may perform fast and efficient data transmission with the peripheral device (for example, an external memory connected to the local device through a bus (for example, a PCIE bus), such as a hard disk, a magnetic disk, an optical disc, or a USB flash drive) or the remote device (for example, a cloud server connected to the local device by using a network) by using the data processing apparatus 10. Specifically, storage space of the peripheral device or the remote device may be mapped to MMIO address space of the local device in advance. One or more storage addresses in the storage space of the peripheral device or the remote device are in a one-to-one correspondence with one or more MMIO addresses in the MMIO address space. Then, when there is a data transmission requirement, the processor 101 in the local device may send an instruction to the storage controller 102. The instruction may include a corresponding MMIO address. The storage controller 102 may determine, based on a mapping relationship, an actual storage address that is in the storage space of the peripheral device or the remote device and that corresponds to the MMIO address, and then perform an operation, for example, access corresponding data in the peripheral device or the remote device based on the storage address, to fast and efficiently complete data transmission between the local device and the peripheral device or the remote device.

The following describes in detail a data processing apparatus and a related data processing method in this application in two cases in which data transmission is performed between a local device and a peripheral device of the local device and between a local device and a remote device of the local device.

Figure 4A:
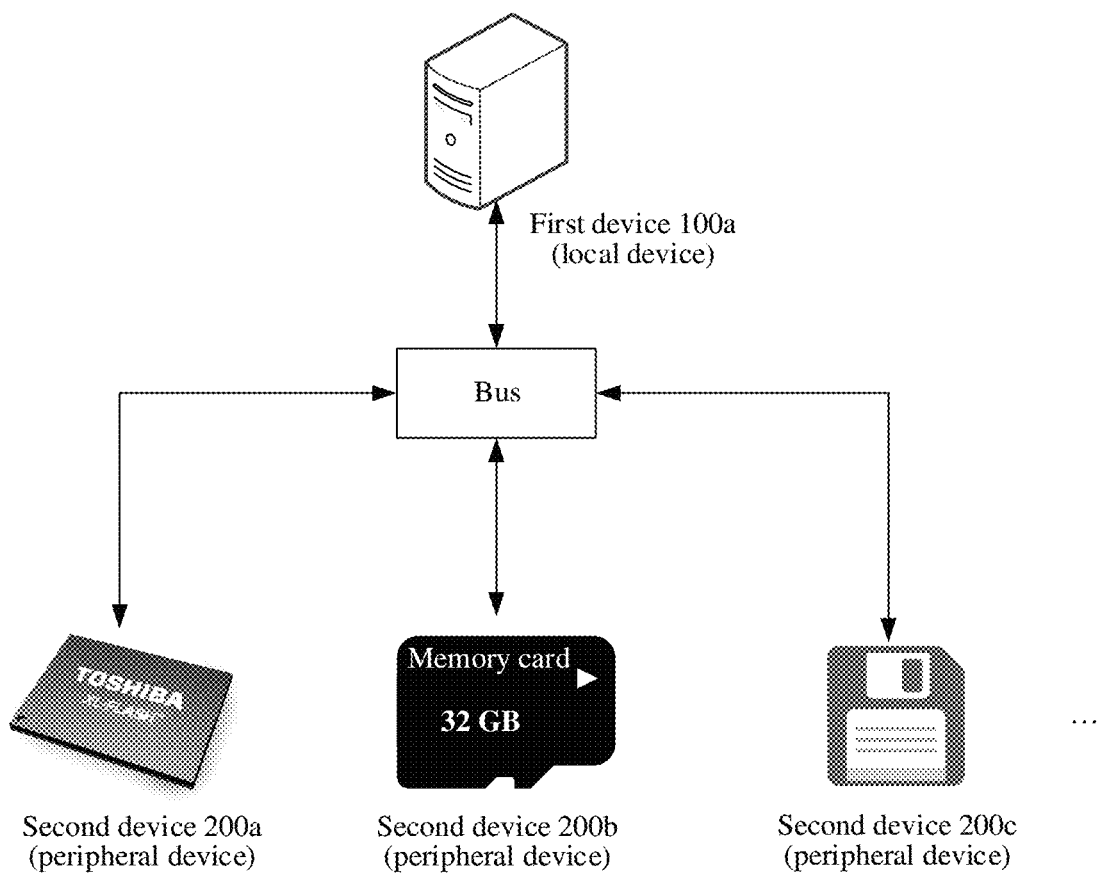
FIG. 4a is a schematic diagram of a system architecture according to an embodiment of this application.

In a possible implementation, data transmission between a local device and a peripheral device is used as an example. FIG. 4a is a schematic diagram of a system architecture according to an embodiment of this application. As shown in FIG. 4a, the system architecture may include a first device 100a and a plurality of second devices, and may specifically include second devices 200a, 200b, and 200c. As shown in FIG. 4a, the first device 100a may be a local device; and may be specifically a device such as a server, a desktop computer, a notebook computer, a tablet computer, or a smartphone, or may be specifically a computer host, or the like. This is not specifically limited in this embodiment of this application. The second devices 200a, 200b, and 200c each may be a peripheral device of the first device 100a, for example, may be a high-speed storage device such as an XL-Flash or a high-speed memory card shown in FIG. 4a, or an external memory such as a magnetic disk shown in FIG. 4a, or may be a device such as a network adapter, a hard disk, an accelerator, or a network controller. The first device 100a may establish connections to the second devices 200a, 200b, and 200c through a bus, and specifically may establish connections to the second devices 200a, 200b, and 200c by using a PCIE bus, a PCI bus, or the like. This is not specifically limited in this embodiment of this application. As described above, storage space of the second devices 200a, 200b, and 200c may be mapped to MMIO address space of the first device 100a. Based on the MMIO address mapping, the first device 100a may deliver instructions, and directly access corresponding storage addresses in the second devices 200a, 200b, and 200c through a bus connection, to perform an operation, for example, read data in the second devices 200a, 200b, and 200c, or write data in the first device 100a into the corresponding storage addresses in the second devices 200a, 200b, and 200c, so that data transmission between the first device 100a and the second devices 200a, 200b, and 200c is completed.

Figure 4B:
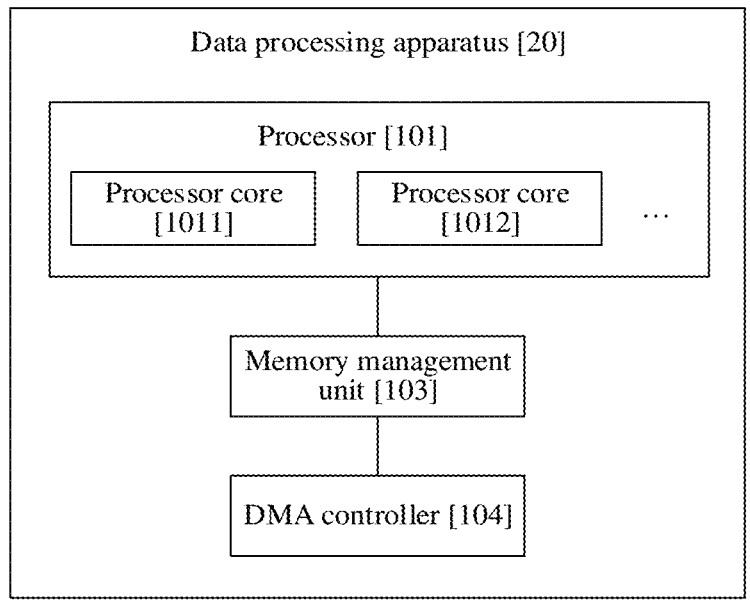
FIG. 4b is a schematic diagram of a structure of another data processing apparatus according to an embodiment of this application.

Based on the system architecture shown in FIG. 4a, this application further provides a data processing apparatus. FIG. 4b is a schematic diagram of a structure of another data processing apparatus according to an embodiment of this application. As shown in FIG. 4b, the data processing apparatus 20 may include a processor 101, a memory management unit 103, and a DMA controller 104. The data processing apparatus 20 may be used in the first device 100a shown in FIG. 4a. As shown in FIG. 4b, the processor 101 may include a plurality of processor cores, and may specifically include a processor core 1011, a processor core 1012, and the like shown in FIG. 4b. Each processor core may independently execute a corresponding task, and each processor core may include a corresponding instruction scheduling unit, a general operation unit, and the like (not shown in FIG. 4b). For example, the instruction scheduling unit may be configured to complete instruction scheduling and distribution, and the general operation unit may execute a corresponding computing task. Details are not described herein. The DMA controller 104 may be the storage controller 102 in FIG. 3. As described above, the storage space of the peripheral devices (the second devices 200a, 200b, and 200c) may be mapped to the MMIO address space of the local device (the first device 100a). One or more storage addresses in the storage space of the peripheral device are in a one-to-one correspondence with one or more corresponding storage addresses in the MMIO address space. Therefore, when there is a data transmission requirement, in an example of using the first device 100a and the second device 200a, any processor core in the data processing apparatus 20 in the first device 100a may send an instruction to the DMA controller 104. The instruction includes a mapped MMIO address that is of the second device 200a and that corresponds to this data transmission task. After receiving the instruction, the DMA controller 104 may determine, based on a mapping relationship, an actual storage address that is in storage space of the second device 200a and that corresponds to the MMIO address in the instruction, and then the DMA controller 104 may directly send a corresponding operation instruction to the second device 200a based on the determined storage address by using a PCIE bus connection. After receiving the operation instruction, the second device 200a may access, based on the operation instruction, the storage address included in the operation instruction; and then perform an operation, for example, read data corresponding to the storage address and send the data to the first device 100a by using the PCIE bus connection, or write received data sent by the first device 100a into the storage address.

Refer to FIG. 4b together. Optionally, when sending, to the DMA controller 104, an instruction used for data transmission, any processor core in the processor 101 in the data processing apparatus 20 may specifically send the instruction to the DMA controller 104 in a form of a data packet. The data packet may include the corresponding instruction. Optionally, in an example of using the processor core 1011 in FIG. 4b, the processor core 1011 may first send the data packet including the instruction to the memory management unit 103. The data packet carries a corresponding virtual address. After receiving the data packet, the memory management unit 103 may first map, to a corresponding physical address, the virtual address to which the data packet needs to be sent. It should be noted that the physical address may be an MMIO address in the MMIO address space, for example, may be an MMIO address that is in the MMIO address space and to which storage space of a peripheral device (for example, the second device 200a) is mapped. The physical address may be an address that is marked or obtained through division in advance and that is associated with the DMA controller 104, and is used to indicate that the data packet is a data packet directly sent to the DMA controller 104, that is, may indicate that this data transmission task is synchronous DMA transmission. Then, the memory management unit 103 may directly send the data packet to the DMA controller 104 based on the physical address. After receiving the data packet, the DMA controller 104 may obtain the instruction in the data packet, and determine an actual storage address that is in the storage space of the peripheral device and that corresponds to the MMIO address in the instruction, to perform subsequent data transmission, or the like. Details are not described herein. Therefore, compared with the foregoing solution in which in asynchronous DMA data transmission, a processor can only first write an instruction into a memory, then perform lock preemption, and finally notify a DMA controller to obtain the corresponding instruction from the memory and execute the instruction, in this embodiment of this application, the instruction does not need to be delivered by using a memory. This is more convenient and consumes short time. In conclusion, the processor 101 directly delivers the instruction to the DMA controller 104, so that data transmission between the local device and the peripheral device can be fast and efficiently implemented, thereby greatly reducing an interaction delay between the processor and the DMA controller, and instruction obtaining costs of the DMA controller.

It should be noted that, in the foregoing data transmission process of the DMA controller 104 in this embodiment of this application, the corresponding processor core 1011 in the processor 101 may be in a blocked state. The processor core 1011 cannot execute another work task in the blocked state. That is, each time the processor sends an instruction, the synchronous DMA controller executes the instruction in real time. After completing execution of the instruction, the synchronous DMA controller may immediately send a response message to notify the processor core 1011, and the processor core 1011 may immediately release the blocked state, to execute another task. It may be understood that, compared with the foregoing queue-related asynchronous DMA solution, a synchronous DMA solution is used in this embodiment of this application. In this case, compared with a common DMA controller (alternatively referred to as a normal DMA controller) used in the asynchronous DMA solution, the DMA controller 104 in this embodiment of this application may be a synchronous DMA controller.

Figure 4C:
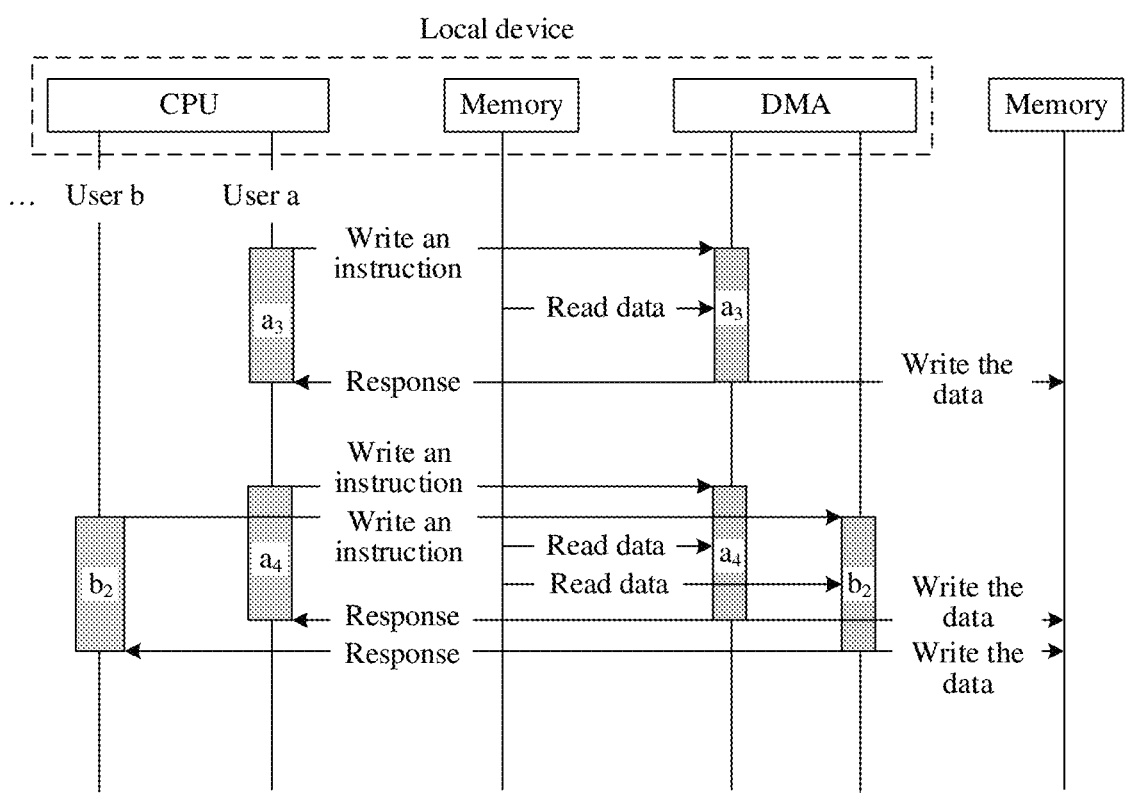
FIG. 4c is a schematic diagram of a synchronous DMA data transmission process according to an embodiment of this application.

Refer to FIG. 4c together. FIG. 4c is a schematic diagram of a synchronous DMA data transmission process according to an embodiment of this application. In FIG. 4c, for example, data in a local device is written into a peripheral device (for example, a memory in FIG. 4c). As shown in FIG. 4c, for example, data transmission tasks $a_3$ and $a_4$ of a user a are executed by the processor core 1011 in FIG. 4b, and a transmission task $b_2$ of a user b is executed by the processor core 1012 in FIG. 4b. In this case, as shown in FIG. 4c, the processor core 1011 is in a blocked state in a process in which the DMA controller executes the data transmission task $a_3$. After completing writing of data in the local device into the peripheral device, the DMA controller may immediately send a response message to the processor core 1011. The processor core 1011 may determine, based on the response message, that execution of a current instruction is completed, and then can process another task. The description is also applicable to the transmission task $b_2$ and the corresponding processor core 1012. Details are not described herein.

Further, as shown in FIG. 4c, because the processor does not execute another task in the data transmission task, this application does not relate to interrupt processing in the foregoing asynchronous DMA solution. In this way, compared with the foregoing asynchronous DMA solution in which a DMA controller needs to generate an interrupt and report the interrupt to a processor after completing execution of an instruction, and then the processor immediately stops other currently executed work based on the interrupt, and performs an operation, for example, reads an execution result of the instruction from a memory, so that the DMA controller completes one times of complete data transmission, and consequently the processor needs to consume a large amount of time to process the interrupt and switch between a plurality of tasks, in this embodiment of this application, occupation for the processor during data transmission with the peripheral device can be greatly reduced, and an interaction delay between the processor and the DMA controller can be further reduced, thereby greatly improving an overall rate of data transmission between the local device and the peripheral device.

It should be noted that, compared with fast data transmission (generally, an actual data transmission process of data transmission (also referred to as data migration), such as data writing or data reading, in which the DMA controller participates usually needs to consume only 2 μs or 1 μs, or even less time. For details, refer to a rectangle on a DMA side in FIG. 4c, FIG. 2b, or FIG. 2c, where the rectangle is obviously shorter) that can be implemented by the DMA controller nowadays, steps, for example, performing lock preemption, writing, by a processor, an instruction into a memory, ringing, by the processor, a doorbell to enter a DMA controller to notify the DMA controller to obtain the corresponding instruction from the memory, and generating, by the DMA controller, an interrupt and reporting the interrupt to the processor after subsequently completing execution of the instruction, involved in the asynchronous DMA solution usually need to consume 4 μs or 5 μs, or even more time (for details, refer to rectangles related to context switching and an interrupt processing program on a CPU side in FIG. 2b or FIG. 2c, where the rectangles are obviously shorter). Therefore, in this embodiment of this application, only an extremely small amount of time of the processor may be occupied in a data transmission process, and the processor does not need to perform complex work that occupies long time, for example, the foregoing writing an instruction into a memory, performing lock preemption, ringing a doorbell to enter a DMA controller, and processing an interrupt, so that occupation of a data transmission task for the processor is further reduced, thereby greatly improving overall working efficiency of a computer. For details, refer to FIG. 4c and FIG. 2b or FIG. 2c. Clearly, occupied time (refer to a rectangle on a CPU side in FIG. 2b or FIG. 2c) for the processor in FIG. 2b or FIG. 2c is obviously longer than occupied time (refer to a rectangle on a CPU side in FIG. 4c) for the processor in FIG. 4c. Details are not described herein.

It may be understood that the foregoing related system architecture and structure of the data processing apparatus are merely some example implementations provided in embodiments of this application. A system architecture and a structure of a data processing apparatus in embodiments of this application include but are not limited to the foregoing implementations. In some possible implementations, the data processing apparatus may further also include the following RDMA controller 105 shown in FIG. 5b, or the like. This is not specifically limited in this embodiment of this application.

Figure 5A:
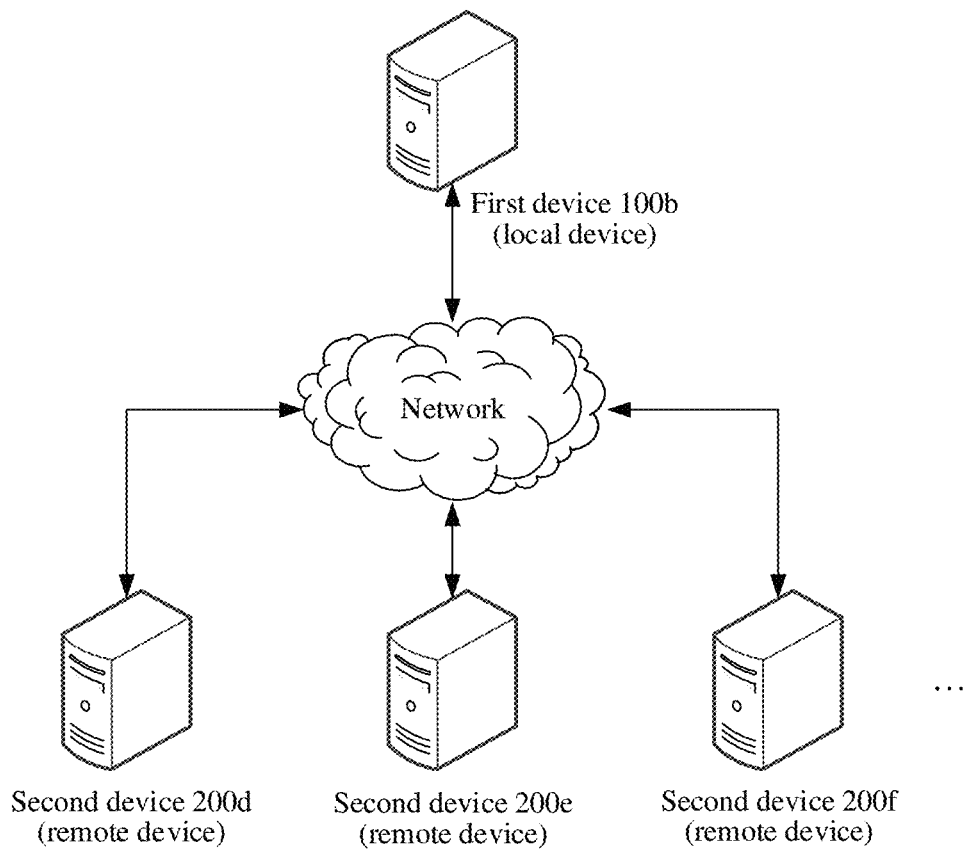
FIG. 5a is a schematic diagram of another system architecture according to an embodiment of this application.

In a possible implementation, data transmission between a local device and a remote device is used as an example. FIG. 5a is a schematic diagram of another system architecture according to an embodiment of this application. As shown in FIG. 5*a*, the system architecture may include a first device 100*b* and a plurality of second devices, and may specifically include second devices 200*d*, 200*e*, and 200*f*. As shown in FIG. 5*a*, the first device 100*b* may be a local device, and may be specifically a device such as a server, a desktop computer, a notebook computer, a tablet computer, or a smartphone. The first device 100*b* may be a server, or may be a server cluster including a plurality of servers, a cloud computing service center, or the like. This is not specifically limited in this embodiment of this application. The second devices 200*d*, 200*e*, and 200*f* each may be a remote device of the first device 100*b*, for example, may be a device such as a server, a desktop computer, a notebook computer, a tablet computer, or a smartphone. The second device may be a server, or may be a server cluster including a plurality of servers, a cloud computing service center, or the like. This is not specifically limited in this embodiment of this application. In some possible embodiments, the first device 100*b* may be used as a client, and the second devices 200*d*, 200*e*, and 200*f* each may be used as a server of the first device 100*b*. As shown in FIG. 5*a*, the first device 100*b* may establish communication connections to the second devices 200*d*, 200*e*, and 200*f* by using a wireless network (for example, wireless fidelity (Wi-Fi), Bluetooth, or a mobile network). As described above, storage space of the second devices 200*d*, 200*e*, and 200*f* may be mapped to MMIO address space of the first device 100*b*. Based on the MMIO address mapping, the first device 100*b* may deliver instructions, and directly access corresponding storage addresses in the second devices 200*d*, 200*e*, and 200*f* through a network connection, to perform an operation, for example, read data in the second devices 200*d*, 200*e*, and 200*f*, or write data in the first device 100*b* into the corresponding storage addresses in the second devices 200*d*, 200*e*, and 200*f*, so that data transmission between the first device 100*b* and the second devices 200*d*, 200*e*, and 200*f* is completed.

Figure 5B:
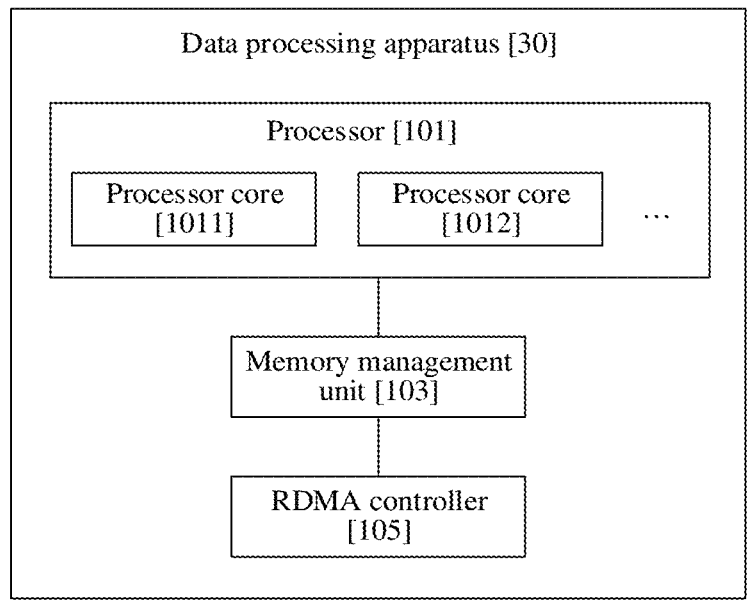
FIG. 5b is a schematic diagram of a structure of still another data processing apparatus according to an embodiment of this application.

Based on the system architecture shown in FIG. 5*a*, this application further provides a data processing apparatus. FIG. 5*b* is a schematic diagram of a structure of still another data processing apparatus according to an embodiment of this application. As shown in FIG. 5*b*, the data processing apparatus 30 may include a processor 101, a memory management unit 103, and an RDMA controller 105. The data processing apparatus 30 may be used in the first device 100*b* shown in FIG. 5*a*. As shown in FIG. 5*b*, the processor 101 may include a plurality of processor cores, and may specifically include a processor core 1011, a processor core 1012, and the like shown in FIG. 5*b*. Each processor core may independently execute a corresponding task. Details are not described herein. For details, refer to the corresponding descriptions in the embodiment in FIG. 4*b*. The RDMA controller 105 may be the storage controller 102 in FIG. 3. As described above, storage space of the remote devices (the second devices 200*d*, 200*e*, and 200*f*) may be mapped to the MMIO address space of the local device (the first device 100*b*). One or more storage addresses in the storage space of the remote device are in a one-to-one correspondence with one or more corresponding storage addresses in the MMIO address space. Therefore, when there is a data transmission requirement, in an example of using the first device 100*b* and the second device 200*d*, any processor core in the data processing apparatus 30 in the first device 100*b* may send an instruction to the RDMA controller 105. The instruction includes a mapped MMIO address that is of the second device 200*d* and that corresponds to this data transmission task. After receiving the instruction, the RDMA controller 105 may determine, based on a mapping relationship, an actual storage address that is in storage space of the second device 200*a* and that corresponds to the MMIO address in the instruction, and then the RDMA controller 105 may directly send a corresponding operation instruction to the second device 200*a* based on the determined storage address through the network connection. After receiving the operation instruction, the second device 200*a* may access, based on the operation instruction, the storage address included in the operation instruction; and then perform an operation, for example, read data corresponding to the storage address and send the data to the first device 100*b* through the network connection, or write data that is sent by the first device 100*b* and that is received by using the network into the storage address. Optionally, a corresponding RDMA controller may also be disposed in the second device 200*d*. The second device 200*d* may receive, by using the RDMA controller in the second device 200*d*, an operation instruction sent by the RDMA controller 105 in the data processing apparatus 30, and perform, by using the RDMA controller in the second device 200*d*, a corresponding data read or write operation or the like based on a storage address included in the operation instruction.

Refer to FIG. 5*b* together. Optionally, when sending, to the RDMA controller 105, an instruction used for data transmission, any processor core in the processor 101 in the data processing apparatus 30 may specifically send the instruction to the RDMA controller 105 in a form of a data packet. The data packet may include the corresponding instruction. Optionally, in an example of using the processor core 1011 in FIG. 5*b*, the processor core 1011 may first send the data packet including the instruction to the memory management unit 103. The data packet carries a corresponding virtual address. After receiving the data packet, the memory management unit 103 may first map, to a corresponding physical address, the virtual address carried in the data packet. It should be noted that the physical address may be an MMIO address in the MMIO address space, for example, may be an MMIO address that is in the MMIO address space and to which storage space of a remote device (for example, the second device 200*d*) is mapped. The physical address may be an address that is marked or obtained through division in advance and that is associated with the RDMA controller 105, and is used to indicate that the data packet is a data packet directly sent to the RDMA controller 105, that is, may indicate that this data transmission task is synchronous RDMA transmission. Then, the memory management unit 103 may directly send the data packet to the RDMA controller 105 based on the physical address. After receiving the data packet, the RDMA controller 105 may obtain the instruction in the data packet, and determine an actual storage address that is in the storage space of the remote device and that corresponds to the MMIO address in the instruction, to perform subsequent data transmission, or the like. Details are not described herein. In conclusion, in this embodiment of this application, the processor 101 may directly deliver the instruction to the RDMA controller 105, so that data transmission between the local device and the remote device can be fast and efficiently implemented, thereby greatly reducing an interaction delay between the processor and the RDMA controller, and the like.

Figure 5C:
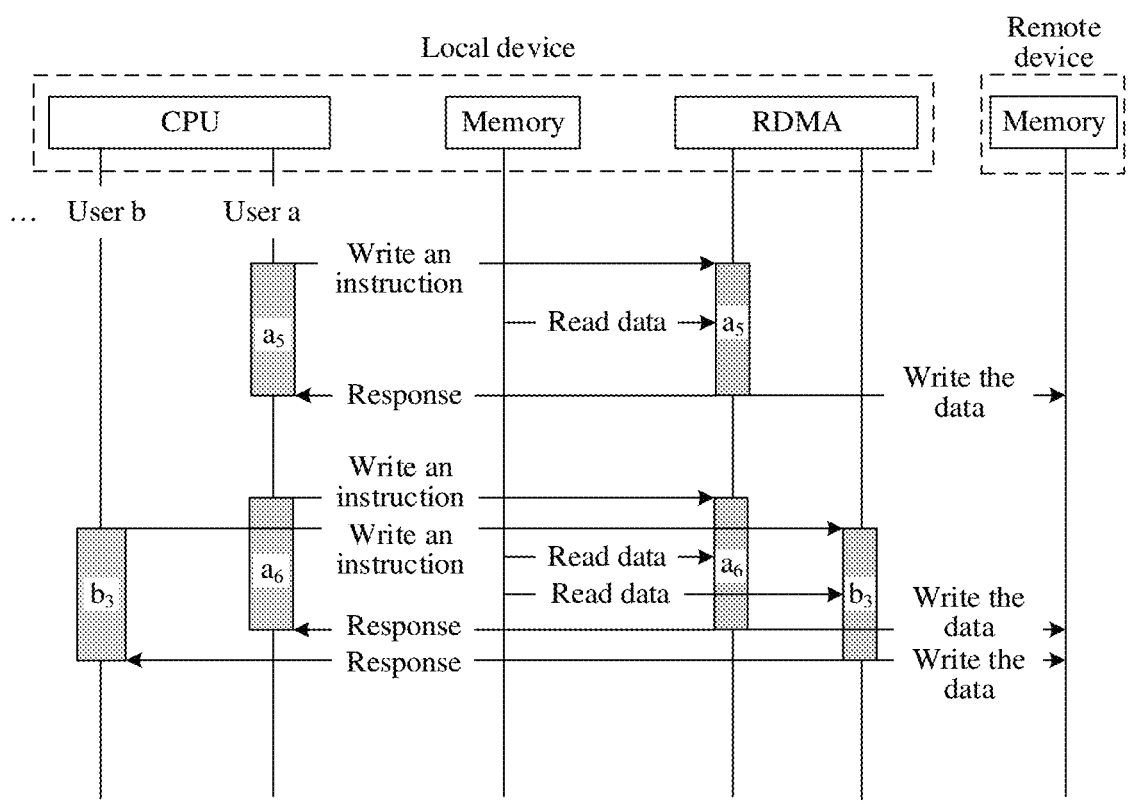
FIG. 5c is a schematic diagram of another synchronous DMA data transmission process according to an embodiment of this application.

It should be noted that, in the foregoing data transmission process of the RDMA controller 105 in this embodiment of this application, the corresponding processor core 1011 in the processor 101 may be in a blocked state. Details are not described herein. Optionally, for this part, refer to the descriptions in the embodiment corresponding to FIG. 4c, or refer to FIG. 5c. FIG. 5c is a schematic diagram of another synchronous DMA data transmission process according to an embodiment of this application. In FIG. 5c, for example, data in a local device is written into a remote device (and may be specifically written into a memory of the remote device, for example, a memory of a cloud server, or written into a corresponding memory). Clearly, correspondingly, in a scenario in which data transmission is performed between the local device and the remote device, a synchronous RDMA solution is used in this embodiment of this application. Compared with a common RDMA controller (alternatively referred to as a normal RDMA controller) that may be used in an existing asynchronous RDMA solution similar to the foregoing asynchronous DMA solution, the RDMA controller 105 in this embodiment of this application may be a synchronous RDMA controller. In this way, refer to the related descriptions of the synchronous DMA solution in FIG. 4b. In this embodiment of this application, occupation for the processor during data transmission with the remote device can be greatly reduced, and an interaction delay between the processor and the RDMA controller can be further reduced, thereby greatly improving an overall rate of data transmission between the local device and the remote device.

Correspondingly, refer to the synchronous DMA solution described in FIG. 4b. Compared with fast data transmission (generally, an actual data transmission process of data transmission, such as data writing or data reading, in which the RDMA controller participates usually needs to consume only 2 μs or 1 μs, or even less time. For details, refer to a rectangle on a DMA side in FIG. 5c, where the rectangle is obviously shorter) that can be implemented by the RDMA controller nowadays, steps, for example, performing lock preemption, writing, by a processor, an instruction into a memory, ringing, by the processor, a doorbell to enter an RDMA controller to notify the RDMA controller to obtain the corresponding instruction from the memory, and generating, by the RDMA controller, an interrupt and reporting the interrupt to the processor after subsequently completing execution of the instruction, involved in the asynchronous RDMA solution usually need to consume 4 μs or 5 μs, or even more time. Therefore, in this embodiment of this application, only an extremely small amount of time of the processor may be occupied in a data transmission process (for details, refer to a rectangular on a CPU side in FIG. 5c, where the rectangular is obviously shorter), and the processor does not need to perform complex work that occupies long time, such as the foregoing writing an instruction into a memory, ringing a doorbell to enter an RDMA controller, and processing an interrupt, so that occupation of a data transmission task for the processor is further reduced, thereby greatly improving overall working efficiency of a computer.

It may be understood that the foregoing related system architecture and structure of the data processing apparatus are merely some example implementations provided in embodiments of this application. A system architecture and a structure of a data processing apparatus in embodiments of this application include but are not limited to the foregoing implementations. In some possible implementations, the data processing apparatus may further also include the foregoing DMA controller 104 shown in FIG. 4b, or the like. This is not specifically limited in this embodiment of this application.

Based on the system architecture shown in FIG. 4a, the data processing apparatus shown in FIG. 4b, and the synchronous DMA data transmission process shown in FIG. 4c, a data processing apparatus and a corresponding data processing method provided in embodiments of this application are further described in detail by using an example in which a data flow direction is from a peripheral device to a local device, that is, data in the peripheral device is written into the local device.

Figures 6, 7:
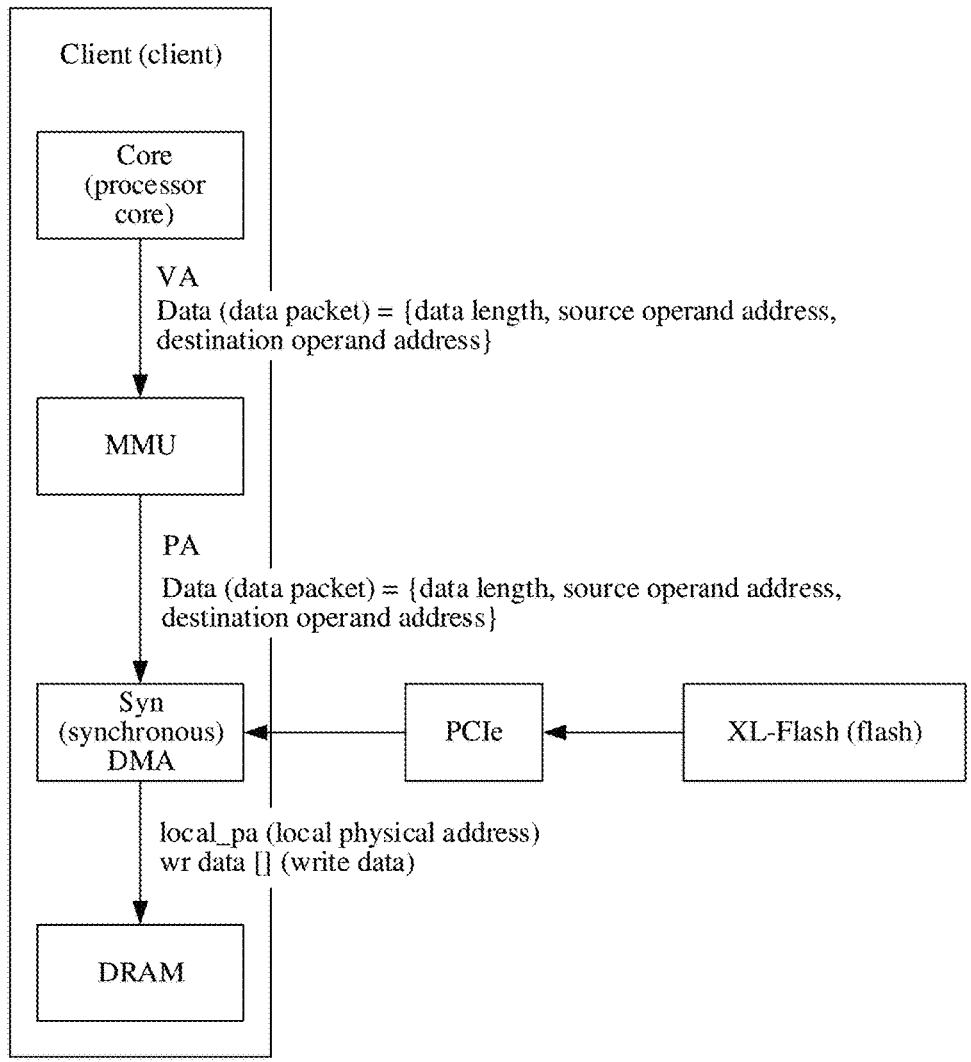
FIG. 6 is a schematic diagram of overall steps of a data processing method according to an embodiment of this application.
FIG. 7 is a schematic diagram of an instruction format according to an embodiment of this application.

FIG. 6 is a schematic diagram of overall steps of a data processing method according to an embodiment of this application. As shown in FIG. 6, a client may be the first device 100a in FIG. 4a, namely, a local device, and an XL-Flash may be a peripheral device of the client, for example, the second device 200a, 200b, or 200c in FIG. 4a. As shown in FIG. 6, the client may include the data processing apparatus 20 shown in FIG. 4b, and may specifically include one or more cores (processor cores), a memory management unit MMU, a syn (synchronous) DMA controller, and the like. The client may establish a connection to the XL-Flash through a bus (for example, a PCIE bus shown in FIG. 6).

As described above, storage space of the XL-Flash may be mapped to MMIO address space of the client. N storage addresses in the storage space of the XL-Flash are in a one-to-one correspondence with N MMIO addresses in the MMIO address space. N is an integer greater than or equal to 1. It may be understood that the MMIO address actually does not store data, and is merely a mapping corresponding to a storage address in the storage space of the XL-Flash. A mapping relationship thereof may be shown in the following Table 1.

TABLE 1

| MMIO address space of the client | Storage space of the XL-Flash |
|---|---|
| MMIO address A | Storage address A' |
| MMIO address B | Storage address B' |
| MMIO address C | Storage address C' |
| MMIO address D | Storage address D' |
| . . . | . . . |

As shown in Table 1, the storage address A' that is in the XL-Flash and that actually stores corresponding data may be mapped to the MMIO address A in the MMIO address space of the local device, the storage address B' that is in the XL-Flash and that actually stores corresponding data may be mapped to the MMIO address B in the MMIO address space of the local device, the storage address C' that is in the XL-Flash and that actually stores corresponding data may be mapped to the MMIO address C in the MMIO address space of the local device, the storage address D' that is in the XL-Flash and that actually stores corresponding data may be mapped to the MMIO address D in the MMIO address space of the local device, and so on. Details are not described herein. For example, Table 1 may be locally stored in the client, or may be also locally stored in the XL-Flash. This is not specifically limited in this embodiment of this application.

Optionally, as shown in FIG. 6, for example, when a memory in the client has free space and data in a peripheral device (for example, the XL-Flash) needs to be migrated to the client, that is, when the client needs to read data in the XL-Flash and write the data into the client, a processor core (or a processor) in the client may first send a corresponding data packet (for example, "data (data packet)={data length, source operand address, destination operand address}" in FIG. 6) to the memory management unit of the client. As shown in FIG. 6, the data packet includes a corresponding instruction for performing data transmission with the XL-Flash. FIG. 7 is a schematic diagram of an instruction format according to an embodiment of this application. As shown in FIG. 7, the instruction in the data packet may include len (data length), src_addr (source operand address), and dst_addr (destination operand address). It may be understood that, because data transmission shown in FIG. 6 is writing data in the XL-Flash into the client, the source operand address in the instruction is an MMIO address (for example, the MMIO address A, the MMIO address B, the MMIO address C, or the MMIO address D in Table 1) obtained after an actual storage address in the storage space of the XL-Flash is mapped. Correspondingly, the destination operand address in the instruction is a storage address in storage space of the client.

Optionally, as shown in FIG. 6, when a data packet is sent by the processor core, the data packet may usually carry a corresponding virtual address (VA). As shown in FIG. 6, after receiving the data packet, the memory management unit may map the virtual address to an actual physical address (PA). The physical address may be an MMIO address in the MMIO address space, for example, may be an MMIO address obtained after a storage address in the storage space of the XL-Flash is mapped. Optionally, the physical address may be an address that is marked or obtained through division in advance and that is associated with the synchronous DMA controller, and is used to indicate that the data packet is a data packet directly sent to the synchronous DMA controller, that is, may indicate that this data transmission task is synchronous DMA transmission. The memory management unit may recognize, based on the physical address, that this data transmission task is synchronous DMA transmission, and then directly send the data packet to the synchronous DMA controller. Optionally, the data packet may be finally written into the physical address. Clearly, as described above, this embodiment of this application is significantly different from the foregoing asynchronous DMA solution. In the foregoing asynchronous DMA solution, a processor core needs to first write an instruction into a queue in a memory, and then notify a DMA controller to obtain the corresponding instruction from the memory. However, in this embodiment of this application, the processor core may directly deliver an instruction to the synchronous DMA controller by writing a data packet including the instruction into a corresponding MMIO address, so that instruction delivery efficiency is greatly improved, occupation of a data processing task for the processor is greatly reduced, and instruction obtaining costs of the synchronous DMA controller and an interaction delay between the processor and the synchronous DMA controller are greatly reduced, thereby further improving an overall data transmission rate of the DMA controller, overall working efficiency of a computer, and the like.

Optionally, after receiving the data packet, the synchronous DMA controller may parse the instruction in the data packet, and determine, based on the mapping relationship shown in Table 1, the actual storage address that is in the storage space of the XL-Flash and that corresponds to the MMIO address (the source operand address) in the instruction. Optionally, the synchronous DMA controller may further generate a corresponding read operation instruction based on the determined storage address. The read operation instruction may include the storage address. Then, the synchronous DMA controller may send the read operation instruction to the XL-Flash by using the PCIE bus connection. The XL-Flash may read, based on the read operation instruction, the data corresponding to the storage address.

For example, if the source operand address in the instruction is the MMIO address A in Table 1, the synchronous DMA controller may determine, based on the mapping relationship shown in Table 1, that a data transmission object corresponding to the instruction is the XL-Flash, and may further determine the storage address A' that is in the storage space of the XL-Flash and that corresponds to the MMIO address A. Then, the synchronous DMA controller may generate, based on the storage address A', the read operation instruction corresponding to the instruction, and send the read operation instruction to the XL-Flash by using the PCIE bus connection shown in FIG. 6. After receiving the read operation instruction, the XL-Flash may read, based on the storage address A' included in the read operation instruction, data corresponding to the storage address A'. In this way, the XL-Flash can be directly accessed by using the determined storage address A' and the PCIE bus connection, to fast and efficiently read the corresponding data.

Further, the XL-Flash may send the read data to the synchronous DMA controller in the client by using the PCIE bus connection. As shown in FIG. 6, after receiving the data fed back by the XL-Flash, the synchronous DMA controller may write the data into the destination operand address in the instruction (for example, "local_pa (local physical address) wr data [ ](write data)" shown in FIG. 6).

Optionally, if the client is further connected to a plurality of peripheral devices (for example, a corresponding hard disk, magnetic disk, USB flash drive, and network adapter) in addition to the XL-Flash shown in FIG. 6, and all storage space of the plurality of peripheral devices is mapped to the MMIO address space of the client, the synchronous DMA controller may further determine, based on the MMIO address and the mapping relationship, a peripheral device (for example, the XL-Flash shown in FIG. 6) corresponding to the MMIO address, and may specifically determine necessary information for transmission with the peripheral device; and then send the read operation instruction to the corresponding peripheral device by using the PCIE bus connection, thereby ensuring data transmission accuracy and efficiency.

Optionally, after the synchronous DMA controller receives the data that is read based on the read operation instruction and that is sent by the XL-Flash, and successfully writes the data into the destination operand address, the synchronous DMA controller may further send a first message to the processor core. The first message may indicate that execution of the instruction succeeds. Then, the processor core may execute a next instruction (for example, execute next-time data transmission, or execute another data processing task) based on the first message, thereby improving overall data processing efficiency.

Optionally, considering that a failure may occur when the data in the peripheral device is migrated to the local device, a corresponding timeout detection mechanism may be further set in some embodiments of this application. Optionally, if the peripheral device (for example, the XL-Flash shown in FIG. 6) does not feed back the corresponding data to the synchronous DMA controller in the client for long time within a preset time range after receiving the corresponding read operation instruction, the synchronous DMA controller may send the read operation instruction to the XL-Flash again. Further, if the XL-Flash still does not feed back the corresponding data after the read operation instruction is sent a plurality of times within a preset time quantity range, the storage controller may send a second message to the corresponding processor core in this case. The second message indicates that execution of the current instruction fails.

Subsequently, the processor may execute a next instruction based on the second message. Optionally, if the synchronous DMA controller does not receive, within the preset time range, the data fed back by the XL-Flash, for example, the synchronous DMA controller may directly send the second message to the processor core without repeatedly sending the read operation instruction. This is not specifically limited in this embodiment of this application. In this way, the synchronous DMA controller and the processor core may not be consumed in one time of data transmission for long time, thereby improving overall data transmission efficiency. Optionally, if the processor core receives the second message indicating that execution of the instruction fails, the processor core may further check a current device status of the XL-Flash, a current connection status of the PCIE bus, and the like, and resolve a problem that occurs therein, to ensure effective execution of a subsequent data transmission task, and the like.

Based on the system architecture shown in FIG. 4a, the data processing apparatus shown in FIG. 4b, and the synchronous DMA data transmission process shown in FIG. 4c, a data processing apparatus and a corresponding data processing method provided in embodiments of this application are further described in detail by using an example in which a data flow direction is from a local device to a peripheral device, that is, data in the local device is written into the peripheral device.

Figure 8:
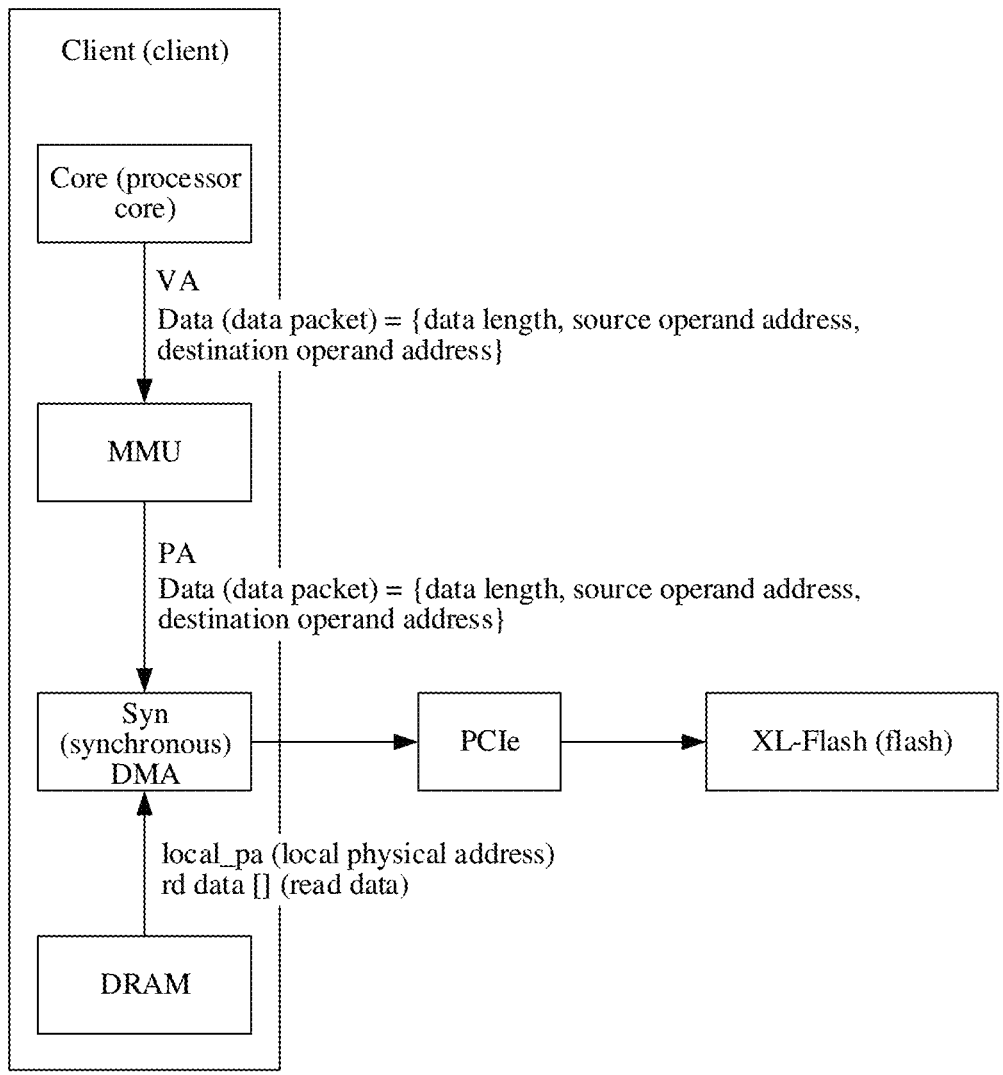
FIG. 8 is a schematic diagram of overall steps of another data processing method according to an embodiment of this application.

FIG. 8 is a schematic diagram of overall steps of another data processing method according to an embodiment of this application. Specifically, for parts in FIG. 8, refer to the corresponding descriptions in the embodiment in FIG. 6. Details are not described herein. It may be understood that, because data transmission shown in FIG. 8 is writing data in a client into an XL-Flash, a source operand address in an instruction is a storage address in storage space of the client. Correspondingly, a destination operand address in the instruction is an MMIO address (for example, the MMIO address A, the MMIO address B, the MMIO address C, or the MMIO address D in Table 1) obtained after an actual storage address in storage space of the XL-Flash is mapped.

Specifically, for an instruction delivery process in FIG. 8, refer to the corresponding descriptions in the embodiment corresponding to FIG. 6. Details are not described herein.

Optionally, after receiving the instruction, a synchronous DMA controller may read corresponding data in the client based on the source operand address in the instruction (for example, "local_pa (local physical address) rd data [ ] (read data)" in FIG. 8), and may send the data to the XL-Flash by using a PCIE bus connection. Correspondingly, the XL-Flash receives the data. Optionally, after receiving the instruction, the synchronous DMA controller may determine, based on the mapping relationship shown in Table 1, the actual storage address that is in the storage space of the XL-Flash and that corresponds to the MMIO address (the destination operand address) in the instruction. Optionally, the synchronous DMA controller may further generate a corresponding write operation instruction based on the determined storage address. The write operation instruction may include the storage address. Then, the synchronous DMA controller may send the write operation instruction to the XL-Flash by using the PCIE bus connection. The XL-Flash may write, into the storage address based on the write operation instruction, the data sent by the client.

For example, if the destination operand address in the instruction is the MMIO address B in Table 1, the synchronous DMB controller may determine, based on the mapping relationship shown in Table 1, that a data transmission object corresponding to the instruction is the XL-Flash, and may further determine the storage address B' that is in the storage space of the XL-Flash and that corresponds to the MMIO address B. Then, the synchronous DMB controller may generate, based on the storage address B', the write operation instruction corresponding to the instruction, and send the write operation instruction to the XL-Flash by using the PCIE bus connection shown in FIG. 8. After receiving the write operation instruction, the XL-Flash may write the data in the client into the storage address B' based on the storage address B' included in the write operation instruction. In this way, the XL-Flash can be directly accessed by using the determined storage address B' and the PCIE bus connection, to fast and efficiently write the data of the client into the XL-Flash.

For other descriptions of FIG. 8, refer to the descriptions in the embodiment corresponding to FIG. 6. Details are not described herein.

Optionally, after successfully writing the data sent by the client into the corresponding storage address, the XL-Flash may send a response message to the synchronous DMA controller in the client by using the PCIE bus connection, and the synchronous DMA controller may determine, based on the response message, that the XL-Flash completes data writing. Then, the synchronous DMA controller may send a first message to a processor core. The first message may indicate that execution of the current instruction succeeds. The processor core may execute a next instruction based on the first message, thereby improving overall data processing efficiency.

Optionally, corresponding to the embodiment in FIG. 6, considering that a failure may occur when the data in the local device is migrated to the peripheral device, a corresponding timeout detection mechanism may be further set in some embodiments of this application. Optionally, if the peripheral device (for example, the XL-Flash shown in FIG. 6) does not feed back the response message for long time (it may be considered that the peripheral device does not successfully write the data in the client into the corresponding storage address in the peripheral device for long time) within a preset time range after receiving the corresponding write operation instruction, the synchronous DMA controller may send the write operation instruction to the XL-Flash again. Further, if the XL-Flash still does not feed back the response message after the write operation instruction is sent a plurality of times within a preset time quantity range, the storage controller may send a second message to the corresponding processor core in this case. The second message may indicate that execution of the current instruction fails. Subsequently, the processor may execute a next instruction based on the second message. Optionally, if the synchronous DMA controller does not receive the response message of the XL-Flash within the preset time range, for example, the synchronous DMA controller may directly send the second message to the processor core without repeatedly sending the write operation instruction. This is not specifically limited in this embodiment of this application. Details are not described herein.

Based on the system architecture shown in FIG. 5a, the data processing apparatus shown in FIG. 5b, and the synchronous RDMA data transmission process shown in FIG. 5c, a data processing apparatus and a corresponding data processing method provided in embodiments of this application are further described in detail by using an example in which a data flow direction is from a remote device to a local device, that is, data in the remote device is written into the local device.

Figure 9:
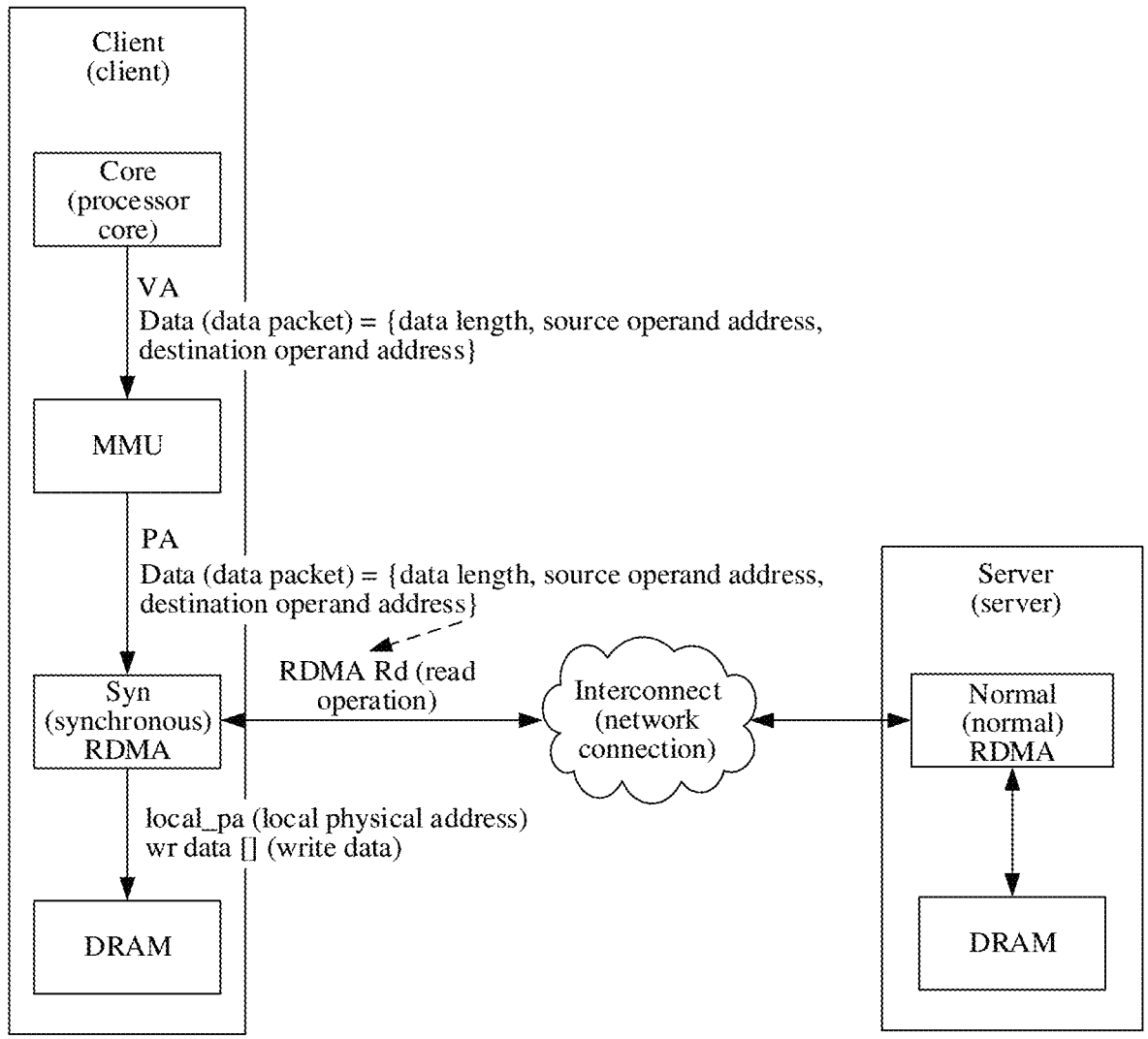
FIG. 9 is a schematic diagram of overall steps of still another data processing method according to an embodiment of this application.

FIG. 9 is a schematic diagram of overall steps of still another data processing method according to an embodiment of this application. As shown in FIG. 9, a client may be the first device 100b in FIG. 5a, namely, a local device, and a server may be a remote device of the client, for example, the second device 200d, 200e, or 200f in FIG. 5a. As shown in FIG. 9, the client may include the data processing apparatus 30 shown in FIG. 5b, and may specifically include one or more cores (processor cores), a memory management unit MMU, a syn (synchronous) DMA controller, and the like. As shown in FIG. 9, the client may establish a connection to the server by using a network (for example, Wi-Fi, a mobile network, or Bluetooth). The server may include a normal RDMA controller and a DRAM.

As described above, storage space of the server may be mapped to MMIO address space of the client. M storage addresses in the storage space of the server are in a one-to-one correspondence with M MMIO addresses in the MMIO address space. M is an integer greater than or equal to 1. It may be understood that the MMIO address actually does not store data, and is merely a mapping corresponding to a storage address in the storage space of the server. A mapping relationship thereof may be shown in the following Table 2.

TABLE 2

| MMIO address space of the client | Storage space of the server |
|---|---|
| MMIO address H | Storage address H' |
| MMIO address I | Storage address I' |
| MMIO address J | Storage address J' |
| MMIO address K | Storage address K' |
| ... | ... |

As shown in Table 2, the storage address H' that is in the server and that actually stores corresponding data may be mapped to the MMIO address H in the MMIO address space of the local device, the storage address I' that is in the server and that actually stores corresponding data may be mapped to the MMIO address I in the MMIO address space of the local device, the storage address J' that is in the server and that actually stores corresponding data may be mapped to the MMIO address J in the MMIO address space of the local device, the storage address K' that is in the server and that actually stores corresponding data may be mapped to the MMIO address K in the MMIO address space of the local device, and so on. Details are not described herein. For example, Table 2 may be locally stored in the client, or may be also locally stored in the server. This is not specifically limited in this embodiment of this application.

Optionally, as shown in FIG. 9, after receiving a data packet, the synchronous RDMA controller in the client may parse an instruction in the data packet, and determine, based on the mapping relationship shown in Table 2, an actual storage address that is in the storage space of the server and that corresponds to an MMIO address (a source operand address) in the instruction. Optionally, the synchronous RDMA controller may further generate a corresponding read operation instruction based on the determined storage address. The read operation instruction may include the storage address. Then, the synchronous RDMA controller may send the read operation instruction to the server through a network connection. The server may read, based on the read operation instruction, data corresponding to the storage address.

For example, if the source operand address in the instruction is the MMIO address H in Table 2, the synchronous RDMA controller may determine, based on the mapping relationship shown in Table 2, that a data transmission object corresponding to the instruction is the server, and may further determine the storage address H' that is in the storage space of the server and that corresponds to the MMIO address H. Then, the synchronous RDMA controller may generate, based on the storage address H', the read operation instruction corresponding to the instruction, and send the read operation instruction to the normal DRAM controller in the server through the network connection shown in FIG. 9. As shown in FIG. 9, after receiving the read operation instruction, the normal DRAM controller in the server may access the DRAM in the server based on the storage address H' included in the read operation instruction, and read data corresponding to the storage address H'. In this way, the DRAM in the server can be directly accessed by using the determined storage address H' and the network connection, to fast and efficiently read the corresponding data.

Further, the normal DRAM controller in the server may further send the read data to the synchronous RDMA controller in the client through the network connection. As shown in FIG. 9, after receiving the data fed back by the server, the synchronous RDMA controller may write the data into a destination operand address in the instruction (for example, "local_pa (local physical address) wr data [ ] (write data)" shown in FIG. 9).

Optionally, corresponding to the embodiment in FIG. 6, if the client is further connected to a plurality of remote devices (for example, a plurality of servers in a cloud service center) in addition to the server shown in FIG. 9, and all storage space of the plurality of remote devices is mapped to the MMIO address space of the client, the synchronous RDMA controller may further determine, based on the MMIO address and the mapping relationship, a remote device (for example, the server shown in FIG. 9) corresponding to the MMIO address, and may specifically determine necessary information for transmission with the remote device, and the like; and then send the read operation instruction to the corresponding remote device through the network connection, and may specifically send the read operation instruction to a normal RDMA controller in the corresponding remote device, thereby ensuring data transmission accuracy and efficiency.

Optionally, after the synchronous RDMA controller receives the data that is read based on the read operation instruction and that is sent by the server, and successfully writes the data into the destination operand address, the synchronous RDMA controller may further send a first message to a processor core. The first message may indicate that execution of the instruction succeeds. Then, the processor core may execute a next instruction (for example, execute next-time data transmission, or execute another data processing task) based on the first message, thereby improving overall data processing efficiency.

Optionally, corresponding to the embodiment in FIG. 6, considering that a failure may occur when the data in the remote device is migrated to the local device, a corresponding timeout detection mechanism may be further set in some embodiments of this application. Optionally, if the server does not feed back the corresponding data to the synchronous RDMA controller in the client for long time within a preset time range after receiving the corresponding read operation instruction, the synchronous RDMA controller may send the read operation instruction to the server again. Further, if the server still does not feed back the corresponding data after the read operation instruction is sent a plurality of times within a preset time quantity range, the storage controller may send a second message to the corresponding processor core in this case. The second message may indicate that execution of the current instruction fails. Subsequently, the processor may execute a next instruction based on the second message. Optionally, refer to the descriptions in the embodiment corresponding to FIG. 6. Details are not described herein. In this way, the synchronous RDMA controller and the processor core may not be consumed in one time of data transmission for long time, thereby improving overall data transmission efficiency. Optionally, if the processor core receives the second message indicating that execution of the instruction fails, the processor core may further check a current device status of the server, a current network connection status, and the like, and resolve a problem that occurs therein, to ensure effective execution of a subsequent data transmission task, and the like.

Optionally, for other corresponding descriptions in FIG. 9, refer to the descriptions in the embodiment corresponding to FIG. 6. Details are not described herein.

Based on the system architecture shown in FIG. 5a, the data processing apparatus shown in FIG. 5b, and the synchronous RDMA data transmission process shown in FIG. 5c, a data processing apparatus and a corresponding data processing method provided in embodiments of this application are further described in detail by using an example in which a data flow direction is from a local device to a remote device, that is, data in the local device is written into the remote device.

Figure 10:
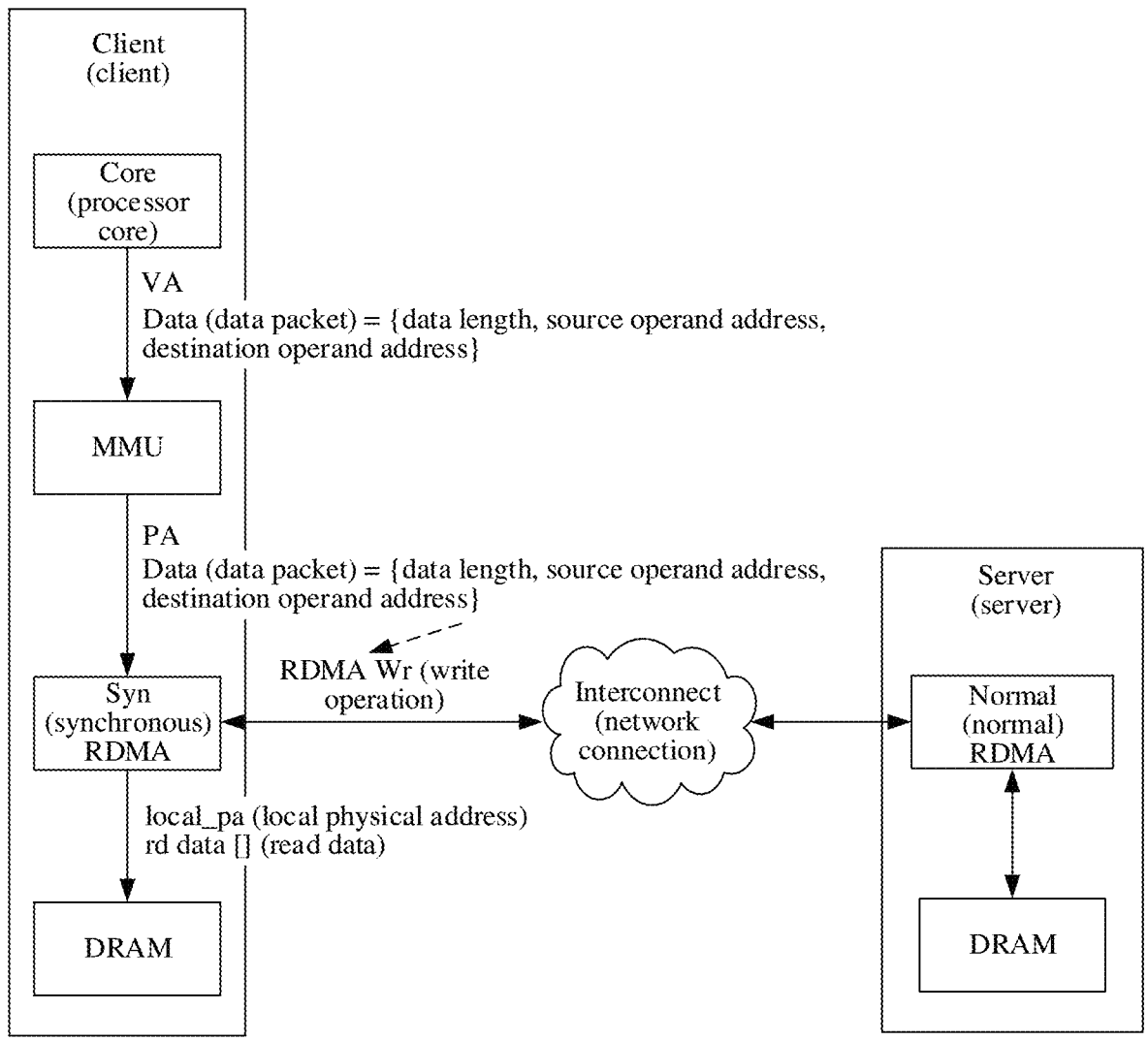
FIG. 10 is a schematic diagram of overall steps of yet another data processing method according to an embodiment of this application.

FIG. 10 is a schematic diagram of overall steps of yet another data processing method according to an embodiment of this application. For descriptions of parts in FIG. 9, refer to the descriptions in the embodiment corresponding to FIG. 9. Details are not described herein.

Optionally, as shown in FIG. 9, after receiving a data packet, a synchronous RDMA controller in a client may parse an instruction in the data packet; read corresponding data in the client based on a source operand address in the instruction; and send the data to a server by using a network connection, and may specifically send the data to a normal RDMA controller in the server. Optionally, the synchronous RDMA controller may determine, based on the mapping relationship shown in Table 2, an actual storage address that is in storage space of the server and that corresponds to an MMIO address (a destination operand address) in the instruction. Optionally, the synchronous RDMA controller may further generate a corresponding write operation instruction based on the determined storage address. The write operation instruction may include the storage address. Then, the synchronous RDMA controller may send the write operation instruction to the normal RDMA controller in the server through the network connection. The normal RDMA controller in the server may write the data in the client into the corresponding storage address in the server based on the write operation instruction. Therefore, the data in the local device is fast and efficiently written into the remote device.

Specifically, for corresponding descriptions in FIG. 10, refer to the descriptions in the embodiments corresponding to FIG. 7 and FIG. 9. Details are not described herein.

In conclusion, on one hand, in embodiments of this application, the processor may directly send an instruction to the DMA controller or the RDMA controller, so that an interaction delay that is between the processor and the DMA controller or the RDMA controller and that exists before data transmission is reduced, thereby improving an overall data transmission rate of the DMA controller or the RDMA controller. In addition, in embodiments of this application, in a data transmission process of the DMA controller or the RDMA controller, the processor is in the blocked state and cannot execute another task. Therefore, after completing execution of the instruction, the DMA controller or the RDMA controller only needs to indicate, to the processor by using a message, that the current instruction is completed. In this case, the processor may immediately release the blocked state to perform an operation, for example, process another task, or send a next instruction used for data transmission to the DMA controller or the RDMA controller, to avoid a large amount of time that originally needs to be consumed because the DMA controller or the RDMA controller needs to generate an interrupt and report the interrupt to the processor after completing execution of the instruction, and then the processor processes the interrupt. In this way, in embodiments of this application, an interaction delay that is between the processor and the DMA controller or the RDMA controller and exists after data transmission is further reduced, thereby further improving an overall data transmission rate of the DMA controller or the RDMA controller.

On the other hand, in embodiments of this application, only an extremely small amount of time of the processor is occupied in a data transmission process of the DMA controller or the RDMA controller, and the processor does not need to perform complex work that occupies long time, such as the foregoing writing an instruction into a memory, ringing a doorbell to enter a DMA controller or an RDMA controller, and processing an interrupt, so that occupation of a data transmission task for the processor is further reduced, thereby greatly improving overall working efficiency of a computer.

It should be noted that embodiments of this application are intended to provide a synchronous DMA/RDMA apparatus, to implement synchronous DMA/RDMA data transmission, thereby improving a data transmission rate between devices. Embodiments of this application may be applied to any possible data transmission scenario, and are not limited to the foregoing page fault application scenario, the foregoing application scenario of data transmission between the local device and the peripheral device or the remote device, or the like. Embodiments of this application may be further applied to another scenario, for example, may be applied to a scenario in which a large block of data needs to be migrated between memories (memory). This is not specifically limited in embodiments of this application.

Figure 11:
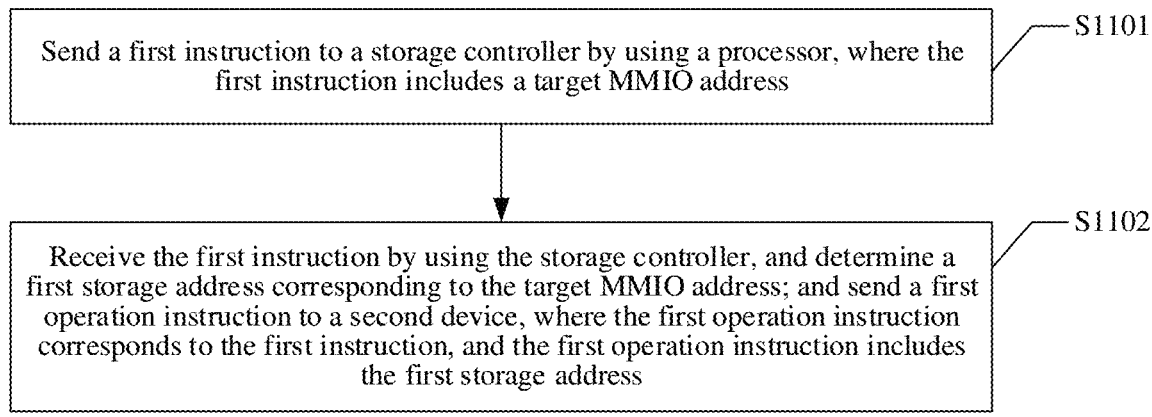
FIG. 11 is a schematic flowchart of a data processing method according to an embodiment of this application.

FIG. 11 is a schematic flowchart of a data processing method according to an embodiment of this application. The data processing method is used in a first device. The first device includes a processor and a storage controller. Storage space of a second device is mapped to memory-mapped input/output MMIO address space of the first device, and N MMIO addresses in the MMIO address space of the first device are in a one-to-one correspondence with N first storage addresses in the storage space of the second device. In addition, the data processing method is applicable to any one of the data processing apparatuses in FIG. 3, FIG. 4b, and FIG. 5b and a device (for example, a mobile phone, a computer, or a server) including the data processing apparatus. As shown in FIG. 11, the method may include the following step S1101 and step S1102.

Step S1101: Send a first instruction to the storage controller by using the processor, where the first instruction includes a target MMIO address, the target MMIO address is one of the N MMIO addresses, and N is an integer greater than or equal to 1.

Step S1102: Receive the first instruction by using the storage controller, and determine a first storage address corresponding to the target MMIO address; and send a first operation instruction to the second device, where the first operation instruction corresponds to the first instruction, and the first operation instruction includes the first storage address.

In a possible implementation, the target MMIO address is a source operand address or a destination operand address in the first instruction.

In a possible implementation, the target MMIO address is the source operand address, and the first operation instruction is a read operation instruction. The method further includes: receiving, by using the storage controller, data sent by the second device, where the data is data that corresponds to the first storage address and that is read by the second device based on the first operation instruction; and by using the storage controller, writing the data into the destination operand address, and sending a first message to the processor, where the destination operand address is one of M second storage addresses in storage space of the first device, M is an integer greater than or equal to 1, and the first message indicates that execution of the first instruction succeeds.

In a possible implementation, the method further includes: if the data sent by the second device is not received within a preset time range by using the storage controller, resending the first operation instruction to the second device at least once within a preset time quantity range by using the storage controller; and if the data sent by the second device is not received after the first operation instruction is resent at least once by using the storage controller, sending a second message to the processor by using the storage controller, where the second message indicates that execution of the first instruction fails.

In a possible implementation, the method further includes: when receiving the first message or the second message, executing a next instruction by using the processor.

In a possible implementation, the target MMIO address is the destination operand address, and the first operation instruction is a write operation instruction. The method further includes: reading, by using the storage controller, data corresponding to the source operand address, and sending the data to the second device, where the source operand address is one of M second storage addresses in storage space of the first device, and M is an integer greater than or equal to 1; and receiving, by using the storage controller, a response message sent by the second device, and sending a first message to the processor based on the response message, where the response message is a message sent by the second device after the second device writes the data into the first storage address based on the first operation instruction, and the first message indicates that execution of the first instruction succeeds.

In a possible implementation, the method further includes: if the response message sent by the second device is not received within a preset time range by using the storage controller, resending the first operation instruction to the second device at least once within a preset time quantity range by using the storage controller; and if the response message sent by the second device is not received after the first operation instruction is resent at least once by using the storage controller, sending a second message to the processor by using the storage controller, where the second message indicates that execution of the first instruction fails.

In a possible implementation, the method further includes: when receiving the first message or the second message, executing a next instruction by using the processor.

In a possible implementation, the second device is a remote device connected to the first device by using a network, and the storage controller is a remote direct memory access RDMA controller. The sending a first operation instruction to the second device includes:

sending the first operation instruction to the second device by using the storage controller and the network connection.

In a possible implementation, the second device is a peripheral device connected to the first device through a bus, and the storage controller is a direct memory access DMA controller. The sending a first operation instruction to the second device includes: sending the first operation instruction to the second device by using the storage controller and the bus connection.

In a possible implementation, storage space of a plurality of devices is mapped to the MMIO address space of the first device, and the second device is one of the plurality of devices. The method further includes:

determining, based on the target MMIO address and a mapping relationship by using the storage controller, the second device corresponding to the first instruction.

In a possible implementation, the first device further includes a memory management unit. The sending a first instruction to the storage controller by using the processor includes: sending a first data packet to the memory management unit by using the processor, where the first data packet includes the first instruction, and the first data packet carries a virtual address; and receiving, by using the memory management unit, the first data packet, and determining a physical address corresponding to the virtual address, where the physical address is an MMIO address in the MMIO address space, and the physical address is used to indicate that the first data packet is a data packet sent to the storage controller; and sending the first data packet to the storage controller based on the physical address by using the memory management unit; and the receiving the first instruction by using the storage controller includes: receiving, by using the storage controller, the first data packet, and obtaining the first instruction in the first data packet.

It should be noted that for a specific process of the processing method described in this embodiment of this application, refer to the related descriptions in the embodiments of the present application in FIG. 1 to FIG. 10. Details are not described herein again.

An embodiment of this application further provides a computer-readable storage medium. The computer-readable storage medium may store a program. When the program is executed by a processor, the processor is enabled to perform some or all of the steps of any one of the methods described in the foregoing method embodiments.

An embodiment of this application further provides a computer program. The computer program includes instructions. When the computer program is executed by a multi-core processor, the processor is enabled to perform some or all of the steps of any one of the methods described in the foregoing method embodiments.

In the foregoing embodiments, the descriptions of the embodiments have respective focuses. For a part that is not described in detail in an embodiment, refer to related descriptions in other embodiments.

It should be noted that, for ease of description, the foregoing method embodiments each are described as a series of action combinations. However, persons skilled in the art should be aware that this application is not limited to the described action order, because some steps may be performed in another order or simultaneously according to this application. Then, persons skilled in the art should be also aware that all the embodiments described in this specification are example embodiments, and the involved actions and modules are not necessarily required in this application.

In the several embodiments provided in this application, it should be understood that the disclosed apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, that is, may be located in one place, or may be distributed on a plurality of network units. Some or all of the units may be selected based on actual requirements to achieve the objectives of the solutions of embodiments.

In addition, the functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the foregoing integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like, and may be specifically a processor in a computer device) to perform all or some of the steps of the methods described in embodiments of this application. The foregoing storage medium includes any medium that can store program code, such as a USB flash drive, a removable hard disk, a magnetic disk, an optical disc, a read-only memory (ROM), or a random access memory (RAM).

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. An apparatus, wherein the apparatus is used in a first device, and the apparatus comprises:
    a processor; and
    a storage controller;
    wherein storage space of a second device is mapped to memory-mapped input/output (MMIO) address space of the first device, and N MMIO addresses in the MMIO address space of the first device are in a one-to-one correspondence with N first storage addresses in the storage space of the second device;
    wherein the processor is configured to send a first instruction to the storage controller, wherein the first instruction comprises a target MMIO address, the target MMIO address is comprised in the N MMIO addresses, and N is an integer greater than or equal to 1, and wherein the target MMIO address is a source operand address or a destination operand address in the first instruction; and
    wherein the storage controller is configured to:
        receive the first instruction;
        determine a first storage address of the second device corresponding to the target MMIO address; and
        send a first operation instruction to the second device, wherein the first operation instruction corresponds to the first instruction, and the first operation instruction comprises the first storage address; and
        when the target MMIO address is the source operand address, and the first operation instruction is a read operation instruction, perform the following:
            attempt to receive data sent by the second device, wherein the data corresponds to the first storage address and is read by the second device based on the first operation instruction;
        in response to receiving data sent by the second device, write the data into the destination operand address, and send a first message to the processor, wherein the destination operand address is comprised in M second storage addresses in storage space of the first device, M is an integer greater than or equal to 1, and the first message indicates that execution of the first instruction succeeds;
        when the data sent by the second device is not received within a preset time range, resend the first operation instruction to the second device at least once within a preset time range; and
        when the data sent by the second device is not received after the first operation instruction is resent at least once, send a second message to the processor, wherein the second message indicates that execution of the first instruction fails; and
    wherein a processor core of the processor that sends the first instruction is in a blocked state and cannot execute another task between sending the first instruction and receiving the first message, or between sending the first instruction and receiving the second message.

2. The apparatus according to claim 1, wherein the processor is further configured to:
    when receiving the first message or the second message, execute a next instruction.

3. The apparatus according to claim 1, wherein the storage controller is further configured to:
    when the target MMIO address is the destination operand address, and the first operation instruction is a write operation instruction, perform the following:
        read data corresponding to the source operand address, and send the data to the second device, wherein the source operand address is comprised in M second storage addresses in storage space of the first device, and M is an integer greater than or equal to 1;
        attempt to receive a response message sent by the second device, wherein the response message is sent by the second device after the second device writes the data into the first storage address based on the first operation instruction; and in response to receiving the response message sent by the second device, send a first message to the processor based on the response message, wherein the first message indicates that execution of the first instruction succeeds.

4. The apparatus according to claim 3, wherein the storage controller is further configured to:
when the response message sent by the second device is not received within the preset time range, resend the first operation instruction to the second device at least once within another preset time range; and
when the response message sent by the second device is not received after the first operation instruction is resent at least once, send a second message to the processor, wherein the second message indicates that execution of the first instruction fails.

5. The apparatus according to claim 4, wherein the processor is further configured to:
when receiving the first message or the second message, execute a next instruction.

6. The apparatus according to claim 1, wherein the second device is a remote device connected to the first device by using a network, and the storage controller is a remote direct memory access (RDMA) controller; and
wherein the storage controller is configured to send the first operation instruction to the second device through a network connection.

7. The apparatus according to claim 1, wherein the first storage address of the second device is a physical storage address of the second device.

8. A method, comprising:
sending, by a processor of a first device, a first instruction to a storage controller of the first device, wherein the first instruction comprises a target memory-mapped input/output (MMIO) address, the target MMIO address is comprised in N MMIO addresses of the first device, and N is an integer greater than or equal to 1, wherein storage space of a second device is mapped to MMIO address space of the first device, and the N MMIO addresses in the MMIO address space of the first device are in a one-to-one correspondence with N first storage addresses in the storage space of the second device, and wherein the target MMIO address is a source operand address or a destination operand address in the first instruction;
receiving, by the storage controller, the first instruction, and determining a first storage address corresponding to the target MMIO address;
sending a first operation instruction to the second device, wherein the first operation instruction corresponds to the first instruction, and the first operation instruction comprises the first storage address;
when the target MMIO address is the source operand address, and the first operation instruction is a read operation instruction, performing the following by the storage controller:
attempting to receive data sent by the second device, wherein the data corresponds to the first storage address and is read by the second device based on the first operation instruction;
in response to receiving data sent by the second device, writing the data into the destination operand address, and sending a first message to the processor, wherein the destination operand address is comprised in M second storage addresses in storage space of the first device, M is an integer greater than or equal to 1, and the first message indicates that execution of the first instruction succeeds;
when the data sent by the second device is not received within a preset time range, resending the first operation instruction to the second device at least once within a preset time range; and
when the data sent by the second device is not received after the first operation instruction is resent at least once, sending a second message to the processor, wherein the second message indicates that execution of the first instruction fails; and
wherein a processor core of the processor that sends the first instruction is in a blocked state and cannot execute another task between sending the first instruction and receiving the first message, or between sending the first instruction and receiving the second message.

9. The method according to claim 8, further comprising:
when receiving the first message or the second message, executing a next instruction by using the processor.

10. The method according to claim 8, further comprising:
when the target MMIO address is the destination operand address, and the first operation instruction is a write operation instruction, reading, using the storage controller, data corresponding to the source operand address, and sending the data to the second device, wherein the source operand address is one of M second storage addresses in storage space of the first device, and M is an integer greater than or equal to 1;
attempting to receive a response message sent by the second device, wherein the response message is sent by the second device after the second device writes the data into the first storage address based on the first operation instruction; and
in response to receiving, using the storage controller, the response message sent by the second device, sending a first message to the processor based on the response message, wherein the first message indicates that execution of the first instruction succeeds.

11. The method according to claim 8, wherein the second device is a remote device connected to the first device by using a network, and the storage controller is a remote direct memory access (RDMA) controller; and sending the first operation instruction to the second device comprises:
sending the first operation instruction to the second device using the storage controller and through a network connection.

12. The method according to claim 8, wherein the second device is a peripheral device connected to the first device through a bus, and the storage controller is a direct memory access (DMA) controller, and sending the first operation instruction to the second device comprises:
sending the first operation instruction to the second device using the storage controller and through a bus connection.

13. The method according to claim 8, wherein the first storage address of the second device is a physical storage address of the second device.

14. A non-transitory computer-readable storage medium, wherein the non-transitory computer-readable storage medium stores a computer program, and when the computer program is executed, a first device is caused to:
send, by a processor of the first device, a first instruction to a storage controller of the first device, wherein the first instruction comprises a target memory-mapped input/output (MMIO) address, the target MMIO address is comprised in N MMIO addresses of the first device, and N is an integer greater than or equal to 1, wherein storage space of a second device is mapped to MMIO address space of the first device, and the N MMIO addresses in the MMIO address space of the first device are in a one-to-one correspondence with N first storage addresses in the storage space of the second device, and wherein the target MMIO address is a source operand address or a destination operand address in the first instruction;

receive, by the storage controller, the first instruction, and determine a first storage address corresponding to the target MMIO address;

send a first operation instruction to the second device, wherein the first operation instruction corresponds to the first instruction, and the first operation instruction comprises the first storage address; and when the target MMIO address is the source operand address, and the first operation instruction is a read operation instruction, perform the following by the storage controller:

attempt to receive data sent by the second device, wherein the data corresponds to the first storage address and is read by the second device based on the first operation instruction;

in response to receiving data sent by the second device, write the data into the destination operand address, and send a first message to the processor, wherein the destination operand address is comprised in M second storage addresses in storage space of the first device, M is an integer greater than or equal to 1, and the first message indicates that execution of the first instruction succeeds;

when the data sent by the second device is not received within a preset time range, resend the first operation instruction to the second device at least once within a preset time range; and when the data sent by the second device is not received after the first operation instruction is resent at least once, send a second message to the processor, wherein the second message indicates that execution of the first instruction fails; and wherein a processor core of the processor that sends the first instruction is in a blocked state and cannot execute another task between sending the first instruction and receiving the first message, or between sending the first instruction and receiving the second message.

15. The non-transitory computer-readable storage medium according to claim 14, wherein when the computer program is executed, the first device is further caused to:
when the processor receives the first message or the second message, execute a next instruction.

16. The non-transitory computer-readable storage medium according to claim 14, wherein when the computer program is executed, the first device is further caused to:
when the target MMIO address is the destination operand address, and the first operation instruction is a write operation instruction, perform the following by the storage controller:

read data corresponding to the source operand address, and send the data to the second device, wherein the source operand address is comprised in M second storage addresses in storage space of the first device, and M is an integer greater than or equal to 1;

attempt to receive a response message sent by the second device, wherein the response message is sent by the second device after the second device writes the data into the first storage address based on the first operation instruction; and in response to receiving the response message sent by the second device, send a first message to the processor based on the response message, wherein the first message indicates that execution of the first instruction succeeds.

17. The non-transitory computer-readable storage medium according to claim 14, wherein the second device is a remote device connected to the first device by using a network, and the storage controller is a remote direct memory access (RDMA) controller; and
wherein the storage controller is configured to send the first operation instruction to the second device through a network connection.

18. The non-transitory computer-readable storage medium according to claim 14, wherein the first storage address of the second device is a physical storage address of the second device.

* * * * *